US012784405B2

(12) United States Patent
Jung et al.

(10) Patent No.: US 12,784,405 B2
(45) Date of Patent: Nov. 3, 2026

(54) IMAGE PROCESSING DEVICE INCLUDING NEURAL NETWORK PROCESSOR FOR PROCESSING PATCH IMAGES AND IMAGE PROCESSING METHOD

(71) Applicant: SAMSUNG ELECTRONICS CO., LTD., Suwon-si (KR)

(72) Inventors: Seungwon Jung, Seoul (KR); Hongjae Lee, Seoul (KR); Junsang Yoo, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 271 days.

(21) Appl. No.: 18/667,026

(22) Filed: May 17, 2024

(65) Prior Publication Data

US 2024/0420451 A1 Dec. 19, 2024

(30) Foreign Application Priority Data

Jun. 19, 2023 (KR) ........................ 10-2023-0078358
Aug. 4, 2023 (KR) ........................ 10-2023-0102284

(51) Int. Cl.
*G06V 10/762* (2022.01)
*G06T 3/18* (2024.01)
(Continued)

(52) U.S. Cl.
CPC .............. *G06V 10/762* (2022.01); *G06T 3/18* (2024.01); *G06T 7/11* (2017.01); *G06V 10/28* (2022.01);
(Continued)

(58) Field of Classification Search
CPC .... G06V 10/762; G06V 10/28; G06V 10/764; G06V 10/771; G06V 10/82; G06T 3/18;
(Continued)

(56) References Cited

U.S. PATENT DOCUMENTS 10,713,794 B1 * 7/2020 He ............................ G06T 7/11
11,537,787 B2 * 12/2022 Shekhar ................ G06F 18/211
(Continued)

FOREIGN PATENT DOCUMENTS

CN 108734659 A 11/2018
CN 110166779 8/2019
(Continued)

OTHER PUBLICATIONS

Hong, et al., "CADyQ: Content-Aware Dynamic Quantization for Image Super-Resolution", arXiv preprint arXiv:2207.10345v3 [cs.CV] Oct. 30, 2022, 26 pages.
(Continued)

*Primary Examiner* — Mia M Thomas
(74) *Attorney, Agent, or Firm* — Morgan, Lewis & Bockius LLP

(57) ABSTRACT

An image processing device is trained to cluster a plurality of patch images into a plurality of clusters, select a first patch image from each of the plurality of clusters as a reference patch image and select a second patch image from each of the plurality of clusters as a query patch image, and perform quantization on the reference patch image and the query patch image using different numbers of bits.

17 Claims, 14 Drawing Sheets

(51) Int. Cl.

| | |
|---|---|
| ***G06T 7/11*** | (2017.01) |
| ***G06V 10/28*** | (2022.01) |
| ***G06V 10/764*** | (2022.01) |
| ***G06V 10/771*** | (2022.01) |

(52) U.S. Cl.
CPC .......... *G06V 10/764* (2022.01); *G06V 10/771* (2022.01); *G06T 2207/20084* (2013.01)

(58) Field of Classification Search
CPC ............. G06T 7/11; G06T 2207/20084; G06T 3/4046; G06T 3/4053; G06N 3/045
See application file for complete search history.

(56) References Cited

U.S. PATENT DOCUMENTS

| | | | | |
|---|---|---|---|---|
| 11,741,662 | B2 * | 8/2023 | Davies | G06N 3/0455 345/419 |
| 11,869,057 | B2 * | 1/2024 | Kiapour | G06F 16/532 |
| 12,142,023 | B2 * | 11/2024 | Abbeloos | G06N 3/0455 |
| 2014/0270431 | A1 * | 9/2014 | Xu | G06F 18/2414 382/128 |
| 2019/0188882 | A1 * | 6/2019 | Son | G06F 3/048 |
| 2019/0253270 | A1 * | 8/2019 | Glaser | H05B 47/1965 |
| 2019/0347767 | A1 * | 11/2019 | Yang | G06T 7/11 |
| 2020/0193647 | A1 * | 6/2020 | Jeon | G06N 3/09 |
| 2021/0118136 | A1 * | 4/2021 | Hassan-Shafique | G16B 20/20 |
| 2021/0127135 | A1 * | 4/2021 | Lee | H04N 19/172 |
| 2021/0150818 | A1 * | 5/2021 | Dedonato | G06F 3/011 |
| 2022/0239944 | A1 * | 7/2022 | Zhang | H04N 19/172 |
| 2022/0269941 | A1 | 8/2022 | Ji et al. | |
| 2023/0071368 | A1 * | 3/2023 | Seo | G06T 5/60 |
| 2023/0306718 | A1 * | 9/2023 | Revaud | G06V 10/74 |
| 2024/0121398 | A1 * | 4/2024 | Mohamed Ghouse | G06N 3/088 |
| 2024/0422316 | A1 * | 12/2024 | Cui | H04N 19/33 |

FOREIGN PATENT DOCUMENTS

| | | | | | |
|---|---|---|---|---|---|
| CN | 110223231 | A | * | 9/2019 | G06T 3/4053 |
| CN | 110555800 | A | * | 12/2019 | G06T 3/4053 |
| CN | 111800633 | | | 10/2020 | |
| CN | 112287986 | | | 1/2021 | |
| CN | 113821667 | | | 12/2021 | |
| CN | 114676279 | | | 9/2022 | |
| CN | 116051917 | | | 5/2023 | |
| CN | 121810274 | A | * | 4/2026 | G06N 3/0895 |
| EP | 4375877 | A1 | * | 5/2024 | G06T 3/4046 |
| EP | 3502857 | B1 | * | 9/2025 | G06N 3/0455 |
| JP | 6399651 | | | 10/2018 | |
| KR | 10-2022-0025052 | | | 3/2022 | |
| KR | 20240178168 | A | * | 12/2024 | G06V 10/462 |

OTHER PUBLICATIONS

Li, et al., "PAMS: Quantized Super-Resolution via Parameterized Max Scale", arXiv preprint arXiv:2011.04212v1 [eess.IV] Nov. 9, 2020, pp. 1-17.

Hong, et al., "DAQ: Channel-Wise Distribution-Aware Quantization for Deep Image Super-Resolution Networks", arXiv preprint arXiv:2012.11230v3 [cs.CV] Jul. 7, 2022, 10 pages.

* cited by examiner

IMAGE PROCESSING DEVICE INCLUDING NEURAL NETWORK PROCESSOR FOR PROCESSING PATCH IMAGES AND IMAGE PROCESSING METHOD

CROSS-REFERENCE TO RELATED APPLICATIONS

This application is based on and claims priority under 35 U.S.C. § 119 to Korean Patent Application Nos. 10-2023-0078358 and 10-2023-0102284 filed on Jun. 19, 2023 and Aug. 4, 2023 respectively in the Korean Intellectual Property Office, the contents of which are incorporated by reference herein in their entirety.

TECHNICAL FIELD

The inventive concept relates to an image processing device and an image processing method for performing an image processing operation using a neural network processor.

BACKGROUND

Modern advancements in image processing technologies have seen a surge in the utilization of neural networks and artificial intelligence (AI) algorithms. These technologies play a pivotal role in various domains, including but not limited to computer vision, medical imaging, autonomous vehicles, and surveillance systems. With the increased demand for high-quality and high-definition images, image data generated from an image sensor may be efficiently processed using a neural network processor. Hence, neural networks and artificial intelligence (AI) algorithms may be implemented for improving image processing methods.

However, conventional image processing methods often encounter limitations in handling complex visual data, particularly in scenarios with varying environmental conditions, diverse image types, or real-time processing requirements. Additionally, the ever-increasing demand for improved accuracy and speed in image analysis necessitates innovative approaches to enhance image processing methods.

Therefore, there is a need in the art for systems and methods that provide an improved image processing system comprising a specialized neural network processor that can optimize the performance and adaptability of existing image processing systems, enabling robust, real-time, and accurate analysis of diverse visual data.

SUMMARY

The present disclosure provides systems and methods for image processing. One or more embodiments of the disclosure include an image processing system configured to receive a low-resolution image, split the low-resolution image into a plurality of patch images, and cluster the patch images based on a differentiating feature. According to an embodiment, the image processing system of the present disclosure further includes a neural network processor configured to differentiate the patch images of each cluster into a reference patch image and a query patch image and perform quantization on the reference patch image and the query patch image using different numbers of bits.

According to an aspect of the present disclosure, there is provided an image processing device including a pre-processor configured to split an input image into a plurality of patch images and a neural network processor configured to generate an output image by performing an image processing operation on each of the plurality of patch images, wherein the neural network processor includes a clustering block trained to cluster the plurality of patch images into a plurality of clusters, to select a first patch image from each of the plurality of clusters as a reference patch image and to select a second patch image from each of the plurality of clusters as a query patch image. Additionally, a super-resolution block is trained to perform quantization on the reference patch image using a first number of bits and on the query patch image using a second numbers of bits different from the first number.

According to another aspect of the present disclosure, there is provided an image processing method including obtaining a plurality of patch images, generating differentiation data based on selecting a first patch image from each of a plurality of clusters formed by clustering the plurality of patch images as a reference patch image and based on selecting a second patch image from each of the plurality of clusters as a query patch image, generating a target feature map of a target patch image included in a target cluster from among the plurality of patch images, determining a feature map type of the target feature map, based on the differentiation data, and performing quantization on the target feature map using a first number of bits or a second number of bits different from the first number of bits.

According to another aspect of the present disclosure, there is provided an image processing device including a memory storing one or more instructions and one or more processors configured to execute the one or more instructions to obtain a plurality of patch images, generate differentiation data based on selecting a first patch image from each of a plurality of clusters formed by clustering the plurality of patch images as a reference patch image and based on selecting a second patch image from each of the plurality of clusters as a query patch image, generate a target feature map of a target patch image included in a target cluster from among the plurality of patch images, determine a feature map type of the target feature map based on the differentiation data, and perform quantization on the target feature map using a first number of bits or a second number of bits different from the first number of bits.

BRIEF DESCRIPTION OF THE DRAWINGS

Embodiments of the present disclosure will be more clearly understood from the following detailed description taken in conjunction with the accompanying drawings and the claims.

DETAILED DESCRIPTION OF THE EMBODIMENTS

Figure 1:
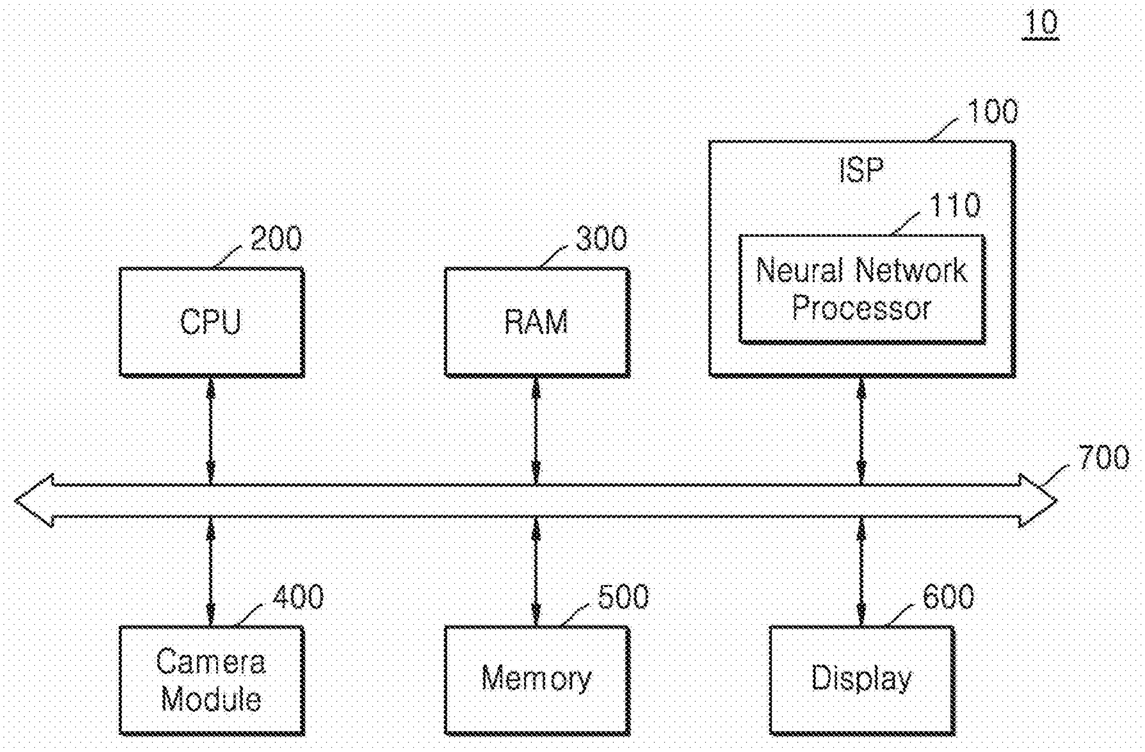
FIG. 1 is a block diagram of an electronic device according to an embodiment.

The present disclosure provides systems and methods for image processing. One or more embodiments of the disclosure include an image processing system configured to receive a low-resolution image, split the low-resolution image into a plurality of patch images, and cluster the patch images based on a differentiating feature. According to an embodiment, the image processing system of the present disclosure further includes a neural network processor configured to differentiate the patch images of each cluster into a reference patch image and a query patch image and perform quantization on the reference patch image and the query patch image using different numbers of bits.

A neural network models the characteristics of a biological neuron of a human being through a mathematical representation and uses an algorithm that copies learning, a capability of the human being. Through this algorithm, a neural network may generate mapping between input data and output data, and the capability of generating such mapping may be referred to as a learning capability of a neural network. A neural network may have a generalization capability to generate, based on a result of learning, appropriate output data with respect to input data not used for learning.

By using a deep neural network, image processing, such as super-resolution, through which a high-resolution image is generated from a low-resolution image, may be performed. When performing image processing by using the neural network, quantization may be performed on parameters. However, existing techniques are not able to minimize the number of operations required for quantization. Moreover, such techniques fail to generate a high-quality image.

Embodiments of the present disclosure include systems and methods for image processing. According to an embodiment, the image processing system may quantize an object patch image using a different number of bits, depending on whether the object patch image is a reference patch image or a query patch image. In some cases, a patch image representing a feature of each cluster is referred to as a reference patch image. Additionally or alternatively, a patch image other than the reference patch image is referred to as a query patch image.

According to an embodiment, the reference patch image may be quantized based on a first number of bits which are a relatively large number of bits. Similarly, the query patch image may be quantized based on a second number of bits which are a relatively small number of bits. The reference patch image that best represents the feature may be quantized using the larger number of bits and the query patch image may be quantized using the smaller number of bits. Accordingly, by using different number of bits for the reference patch image and the query patch image, the number of operations of a neural network may be reduced with respect to the query patch image. The smaller number of bits results in an enhancement in the performance of a neural network processor. Thus, embodiments of the disclosure enable minimization of the use of computational resources while generating a high-quality output image.

One or more embodiments of the present disclosure include an image processing device that may recover a quantization error of a query feature map using a reference feature map. Thus, by recovering a quantization error of a query feature map using a reference feature map, embodiments are able to reduce the quantization error of the query feature map. Accordingly, a high-resolution (or a high-quality) image may be generated by an image processing operation as described with reference to the present disclosure.

Embodiments of the present disclosure include a preprocessor configured to split an input image into a plurality of patch images and a neural network processor configured to generate an output image by performing an image processing operation on each of the plurality of patch images. According to an embodiment, the neural network processor comprises a clustering block and a super-resolution block. In some cases, the clustering block is trained to cluster the plurality of patch images into a plurality of clusters and differentiate one or more patch images included in each cluster into a reference patch image and a query patch image. As such, the clustering block may be configured to select a first patch image from each of the plurality of clusters as a reference patch image and to select a second patch image from each of the plurality of clusters as a query patch image. Additionally, the super-resolution block is trained to perform quantization on the reference patch image using a first number of bits and on the query patch image using a second number of bits different from the first number.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the example embodiments described herein. Rather, the example embodiments described herein have been provided merely to illustrate some of the many possible ways of implementing the methods, apparatuses, and/or systems described herein that will be apparent after an understanding of the disclosure of this application.

The present disclosure may be modified in multiple alternate forms, and thus specific embodiments will be exemplified in the drawings and described in detail. In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween.

Like reference numerals may refer to like components throughout the specification and the drawings. It is noted that while the drawings are intended to illustrate actual relative dimensions of a particular embodiment of the specification, the present disclosure is not necessarily limited to the embodiments shown. The term "and/or" includes all combinations of one or more of which associated configurations may define.

It will be understood that, although the terms "first," "second," etc. may be used herein to describe various components, these components should not necessarily be limited by these terms. These terms are only used to distinguish one component from another. For example, a first component could be termed a second component, and, similarly, a second component could be termed a first component, without departing from the scope of the inventive concept. The terms of a singular form may include plural forms unless the context clearly indicates otherwise.

Additionally, terms such as "below," "under," "on," and "above" may be used to describe the relationship between components illustrated in the figures. The terms are used as a relative concept and are described with reference to the direction indicated in the drawings. It should be understood that the terms "comprise," "include," or "have" are intended to specify the presence of stated features, integers, steps, operations, components, parts, or combinations thereof in the disclosure, but do not preclude the presence or addition of one or more other features, integers, steps, operations, components, parts, or combinations thereof.

In the present specification, although terms such as first and second are used to describe various elements or components, it goes without saying that these elements or components are not limited by these terms. These terms are only used to distinguish a single element or component from other elements or components. Therefore, it goes without saying that a first element or component referred to below may be a second element or component within the technical idea of the present invention.

Hereinafter, a method of an image processing device of the embodiments of the present disclosure will be described in detail with reference to the accompanying drawings.

FIG. 1 is a block diagram of an electronic device 10 according to an embodiment.

The electronic device 10 may perform an image processing operation on an input image using a neural network, and may generate an output image. The electronic device 10 may include at least one of a smartphone, a tablet personal computer (PC), a mobile phone, a video telephony, an electronic book (e-book) reader, a desktop PC, a laptop PC, a netbook computer, a workstation, a server, a personal digital assistant (PDA), a portable multimedia player (PMP), an MP3 player, a mobile medical device, a camera, or a wearable device. In some cases, the electronic device 10 may include a smart home appliance. The smart home appliance may include, for example, at least one of a television, a digital video disk (DVD) player, an audio player, a refrigerator, an air-conditioner, a cleaning device, an oven, a microwave oven, a laundry machine, an air cleaner, a set-top box, a home automation control panel, a security control panel, a TV box, a game console, an electronic dictionary, an electronic key, a camcorder, or an electronic frame.

In some cases, the electronic device 10 may include various medical devices, for example, portable medical measuring devices (e.g., a blood sugar measuring device, a heart rate measuring device, a blood pressure measuring device, a body temperature measuring device, etc.), a magnetic resonance angiography (MRA) device, a magnetic resonance imaging (MRI) device, a computed tomography (CT) device, a camera, an ultrasonic device, etc. In some cases, the electronic device 10 may be an application processor. The application processor may perform various types of calculation operations. In some cases, the electronic device 10 may include a neural processing unit (NPU) to perform an operation using a neural network.

Referring to FIG. 1, the electronic device 10 may include an image processing device 100, a central processing unit (CPU) 200, a random-access memory (RAM) 300, a camera module 400, a memory 500, a display 600, and a system bus 700. According to an embodiment, the electronic device 10 may further include other general-purpose elements in addition to the elements illustrated in FIG. 1. For example, the electronic device 10 may further include an input and output module, a security module, a power control device, etc. In some cases, the electronic device 10 may further include various types of processors. In some cases, according to an embodiment, at least one of the elements of FIG. 1 may be omitted in the electronic device 10. The elements of the electronic device 10 may communicate with each other through the bus 700.

According to some embodiments, a part or all the elements of the electronic device 10 may be formed in a single semiconductor chip. For example, the electronic device 10 may be realized as a system on chip (SoC) and according to some embodiments, may be referred to as an image chip, etc.

According to an embodiment, the image processing device 100 may generate an output image by performing an image processing of an input image. The image processing device 100 perform image processing on an input image using a neural network processor 110 and may generate an output image. The input image may be referred to as input image data, input data, etc. The neural network processor 110 may train (or learn) a neural network or analyze the input data by using the neural network and may infer information included in the input data. Based on the inferred information, the neural network processor 110 may determine a condition or control the elements of the electronic device 10 in which the neural network processor 110 is mounted.

In some cases, an image processing device 100 may comprise a high-resolution sensor array capturing visual data, coupled with advanced processing units e.g., employing convolutional neural networks (CNNs), for real-time analysis. The device 100 may incorporate algorithms for image enhancement, noise reduction, and feature extraction. In some examples, an architecture of the image processing device 100 may enable seamless integration with various imaging systems, from consumer-grade cameras to medical imaging devices. By utilizing deep learning techniques, the device 100 may efficiently recognize objects, patterns, and scenes with exceptional accuracy. Additionally, the compact design, low power consumption, and scalable performance make the device ideal for diverse applications, including surveillance, autonomous vehicles, medical diagnostics, and industrial quality control.

According to an embodiment, the image processing device 100 may include a pre-processor and a neural network processor. In some cases, the pre-processor may be configured to split an input image into a plurality of patch images. In some cases, the neural network processor (e.g., neural network processor 110) may be configured to generate an output image by performing an image processing operation on each of the plurality of patch images. Further details regarding the neural network processor 110 are provided with reference to FIG. 3.

The neural network processor 110 may perform a neural network operation based on an input image that is received. Furthermore, the neural network processor 110 may generate an information signal, based on a result of the neural network operation. The neural network processor 110 may be implemented as a neural network operation accelerator, a coprocessor, a digital signal processor (DSP), an application specific integrated circuit (ASIC), a field-programmable gate array (FPGA), a graphics processing unit (GPU), a neural processing unit (NPU), a tensor processing unit (TPU), a multi-processor system-on-chip (MPSoC), etc.

The neural network processor 110 may be based on at least one of an artificial neural network (ANN), a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a long short-term memory (LSTM) network, a classification network, a plain residual network, a dense network, a hierarchical pyramid network, and a fully convolutional network. However, types of the neural network processor 110 are not limited to the examples described above.

An artificial neural network (ANN) is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a specialized deep learning model designed for visual processing, particularly suited for image recognition and analysis. It comprises multiple layers of convolutional filters that automatically learn hierarchical representations of features from input images. CNNs excel in recognizing patterns, edges, and complex structures within images, employing techniques like pooling and convolution to extract and process visual information.

A deep neural network (DNN) represents a multi-layered neural network architecture capable of learning intricate patterns and relationships within data. DNNs consist of multiple hidden layers between the input and output layers, allowing them to model complex nonlinear relationships in diverse datasets. They find applications in various domains, including speech recognition, natural language processing, and predictive analytics.

A recurrent neural network (RNN) is a class of neural networks designed to handle sequential data by retaining memory of past inputs. RNNs possess connections that form loops, enabling them to capture temporal dependencies within sequences, making them ideal for tasks like speech recognition, language modeling, and time-series analysis.

A classification network is a type of neural network primarily used for categorizing or assigning labels to input data. The network typically consists of layers that transform raw input into class probabilities, enabling the network to classify data into predefined categories or classes. Classification networks are foundational in applications like image classification, sentiment analysis, and disease diagnosis.

According to an embodiment, the image processing device 100 may receive an input image. For example, the image processing device 100 may receive an input image from the camera module 400. In some cases, the image processing device 100 may receive an input image generated from an image sensor of the camera module 400 and may perform image processing operations on the input image to generate an output image. However, the image processing device 100 is not necessarily limited thereto. In some cases, the image processing device 100 may perform an image processing operation on an input image pre-stored in the electronic device 10 and in some cases, the device 100 may perform an image processing operation on an input image received from the outside of the electronic device 10.

According to an embodiment, the image processing device 100 may receive image data from the camera module 400 or the memory 500 and may perform a neural network operation based on the received image data. The image processing device 100 may perform an image processing operation defined using a neural network operation. In some cases, the image processing device 100 may include a neural network processor 110.

The neural network processor 110 may be trained to perform an image processing operation on an input image. The neural network processor 110 may generate an output image by performing the image processing operation on the input image. According to an embodiment, the image processing operation may correspond to a super-resolution operation for generating a high-resolution image of the input image. The input image may include an image including noise or a low-resolution image. The output image may include a high-resolution image having a higher resolution than the input image or an image with a better image quality than the input image.

According to an embodiment, the image processing device 100 may further perform various image processing operations, such as bad pixel correction (BPC), lens shading correction (LSC), cross (X)-talk correction, a remosaic operation, a demosaic operation, a denoise operation, etc. However, the types of the image processing operations performed are not limited to the examples described above.

The image processing device 100 may receive the input image and split the received input image into a plurality of images. Hereinafter, the input image split by the image processing device 100 may be referred to as a patch image. The image processing device 100 may split the input image into patch images of predetermined sizes. For example, the patch images may have the same sizes as each other or different sizes from each other. The plurality of patch images may be input to the neural network processor 110. The neural network processor 110 may perform an image processing operation on each of the patch images.

The neural network processor 110 may perform a neural network operation on the patch image. The neural network processor 110 may extract a feature from each of the patch images and may perform a neural network operation based on the extracted feature. The neural network processor 110 may use a neural network trained to perform an image processing operation to generate a high-quality and high-resolution image.

The neural network processor 110 may perform a clustering operation to execute a super-resolution process. The neural network processor 110 may cluster, from among the plurality of patch images, one or more patch images, according to the number of clusters, and may differentiate whether each of the plurality of patch images is a reference patch image or a query patch image. In some cases, a patch image representing a feature of each cluster is referred to as a reference patch image. In some cases, a patch image that is not the reference patch image is referred to as a query patch image. The neural network processor 110 may cluster the plurality of patch images according to the number of clusters. The number of clusters may be predetermined or may be determined based on a training process. According to the number of clusters, the neural network processor 110 may cluster the plurality of patch images such that similar patch images form a cluster.

The neural network processor 110 may select at least one patch images in each cluster as a reference patch image, and may select at least one patch images in the cluster as a query patch image. The reference patch image may denote an image representing each cluster, and the query patch image may denote a patch image that is not the reference patch image in each cluster. The neural network processor 110 may differentiate a patch image best representing a feature of each cluster as the reference patch image of each cluster. For example, when a first cluster includes a first patch image, a second patch image, and a third patch image, the neural network processor 110 may differentiate the first patch image, which best represents a feature of the first cluster, as the reference patch image, and the second patch image and the third patch image as the query patch image.

Parameters of a neural network may be used to perform an image processing operation on the patch image. The neural network processor 110 may use parameters to perform a neural network operation. The parameters may be obtained through the training process configured to generate an output image by performing an image processing operation on a patch image. For example, the parameters of the neural network may be obtained through the training process configured to generate the output image by performing a super-resolution operation on the patch image. The parameters may be used to perform the neural network operation and may include, for example, various types of data that are input/output to and from a neural network, such as input/output activations, weights, biases, etc. of the neural network. For example, the parameters may be stored in an internal memory of the image processing device 100 or may be stored in the memory 500. The parameters stored in the memory 500 may be provided to the image processing device 100.

The neural network processor 110 may perform quantization on each of the patch images. In order to perform image processing on each of the patch images, the neural network processor 100 may perform quantization on obtained parameters. The quantization of parameters may denote conversion of floating point type parameters to fixed point type parameters. For example, the neural network processor 110 may perform quantization on activations and weights of the neural network for performing a neural network operation on each of the patch images. Performing a quantization process on images may denote performing quantization on parameters, which are used to process a predetermined (e.g., low-resolution) image into a high-resolution image.

According to an embodiment, the neural network processor 110 may perform quantization on the reference patch image and the query patch image based on different numbers of bits, according to whether the patch image in each cluster corresponds to the reference patch image or the query patch image. The neural network processor 110 may perform quantization on a feature map corresponding to the patch image. For example, when a target patch image, which is an object of image processing, is the reference patch image, the neural network processor 110 may perform quantization on a feature map corresponding to the target patch image, based on a first number of bits. For example, when the first patch image of the first cluster corresponds to the reference patch image, the neural network processor 110 may perform quantization on a feature map corresponding to the first patch image, based on the first number of bits.

For example, when the target patch image, which is the object of image processing, is the query patch image, the neural network processor 110 may perform quantization on the feature map corresponding to the target patch image, based on a second number of bits. For example, when the second patch image of the first cluster corresponds to the query patch image, the neural network processor 110 may perform quantization on a feature map corresponding to the second patch image based on the second number of bits.

When a neural network operation is performed to process a low-resolution image into a high-resolution image, large number of computational resources is required. When the image processing device performs the neural network operation, the image processing device may perform quantization on the reference patch image using an increased number of bits and may perform quantization on the query patch image using a relatively decreased number of bits. Accordingly, the number of computational resources may be reduced and a speed and accuracy of the image processing device may be improved.

The camera module 400 may capture an image of an object outside the electronic device 10 and may generate image data. For example, the camera module 400 may include an image sensor. The image sensor may convert an optical signal of the object into an electrical signal using an optical lens. Thus, the image sensor may include a pixel array in which a plurality of pixels are two-dimensionally arranged. For example, one from among a plurality of reference colors may be assigned to each of the plurality of pixels. For example, the plurality of reference colors may be red, green, and blue (RGB) or red, green, blue, and white (RGBW).

The camera module 400 may generate an input image using the image sensor. The input image may be referred to in various ways. For example, the input image may be referred to as image data, an image frame, and frame data. The input image may be provided to the image processing device 100 as input data or may be stored in the memory 500. The input image stored in the memory 500 may be provided to the image processing device 100 as input data.

The CPU 200 may control general operations of the electronic device 10. The CPU 200 may include a single processor core and multi-processor cores. The CPU 200 may process or execute programs and/or data stored in a storage such as the memory 500, by using the RAM 300. In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

The memory 500 may include at least one of a volatile memory or a nonvolatile memory. The nonvolatile memory may include read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), etc. The volatile memory may include dynamic RAM (DRAM), static RAM (SRAM), synchronous DRAM (SDRAM), PRAM, MRAM, RRAM, ferroelectric RAM (FRAM), etc. According to an embodiment, the memory 500 may include at least one of a hard disk drive (HDD), a solid state drive (SSD), a compact flash (CF) card, a secure digital (SD) card, a micro-SD card, a mini-SD card, an extreme digital (xD) card, or a memory stick. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

The display 600 may display various types of content (for example, text, image, video, icon, symbol, or the like) to a user, based on the image data received from the image processing device 100. For example, the display 600 may include a liquid crystal display (LCD), a light-emitting diode (LED) display, an organic LED (OLED) display, a micro-electromechanical systems (MEMS) display, or an electronic paper display. The display 600 may include a pixel array in which a plurality of pixels are arranged in a matrix form to display an image.

Figure 2:
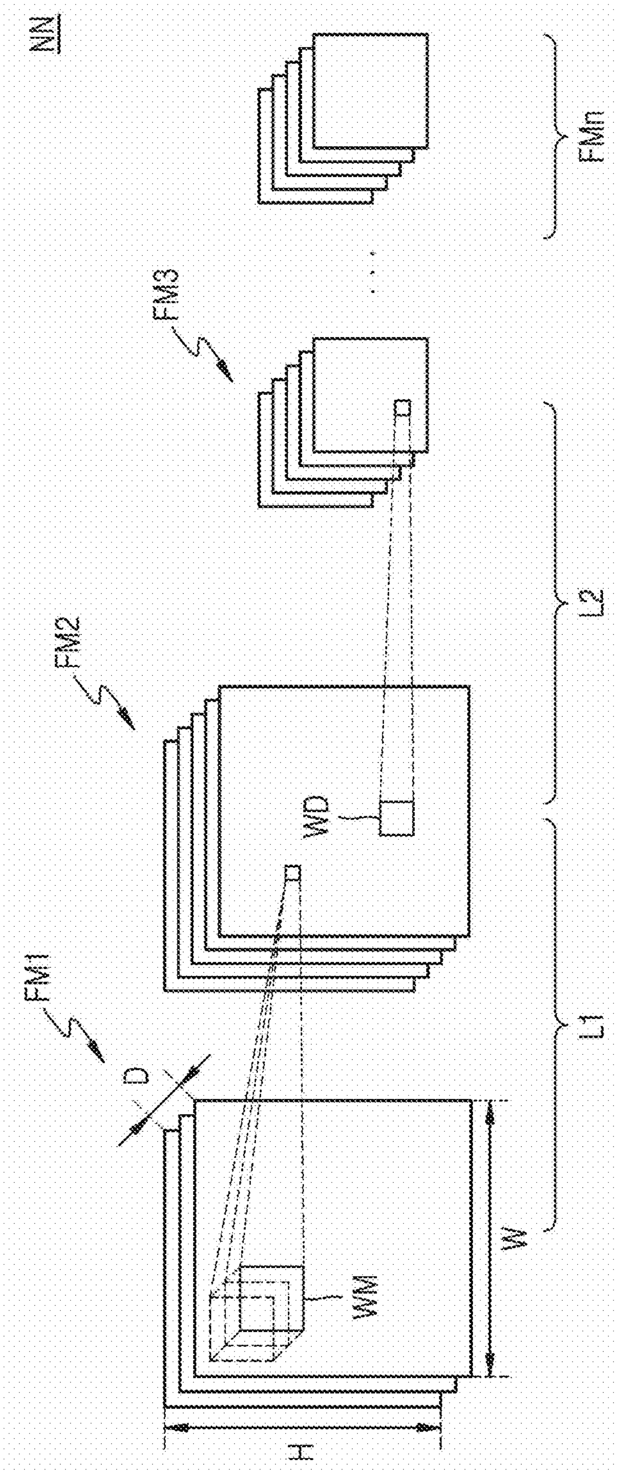
FIG. 2 shows a structure of a neural network according to an embodiment.

FIG. 2 describes a structure of a neural network NN according to an embodiment. FIG. 2 schematically illustrates the structure of the neural network NN, which may be implemented in the neural network processor 110 as described with reference to FIG. 1. An image processing device may cluster patch images by using the neural network NN. The image processing device may quantize the patch images by using the neural network NN.

Referring to FIG. 2, the neural network NN may include a plurality of layers, that is, first to $n^{th}$ layers L1 to Ln. The neural network NN having such a multi-layered structure may be referred to as a deep neural network (DNN) or a deep learning architecture. Each of the plurality of layers L1 to Ln may be a linear layer or a non-linear layer. According to an embodiment, at least one linear layer and at least one non-linear layer may be combined to be referred to as a layer. For example, the linear layer may include a convolution layer and a fully connected layer, and the non-linear layer may include a pooling layer and an activation layer.

A convolution layer in a neural network performs feature extraction by applying convolution operations to input data. It consists of filters or kernels that slide across the input, computing dot products to extract features like edges, textures, or patterns. Convolution layers enable the network to automatically learn and detect hierarchical representations of features, crucial for tasks such as image recognition and analysis in convolutional neural networks (CNNs).

A fully connected layer, also known as a dense layer, connects every neuron in one layer to every neuron in the subsequent layer. In these layers, each neuron receives input from all neurons in the previous layer, providing for comprehensive connections. Fully connected layers are often found in the final stages of neural networks and play a role in high-level reasoning, classification, or regression tasks, consolidating extracted features for decision-making.

Pooling layers are used in neural networks, especially in CNNs, to down-sample and reduce the spatial dimensions of feature maps generated by convolutional layers. Common pooling operations include max pooling and average pooling, which aggregate information from small regions of the input, retaining essential features while reducing computational complexity and preventing overfitting.

An activation layer within a neural network introduces nonlinearity to the network's output, enabling it to learn complex relationships in data. Activation functions like ReLU (rectified linear activation), sigmoid, or Tanh are applied element-wise to the output of neurons, introducing nonlinear transformations that allow neural networks to model and approximate more complex functions, aiding in feature learning and network training.

For example, the first layer L1 may be a convolution layer, the second layer L2 may be a pooling layer, and the $n^{th}$ layer Ln may be an output layer and a fully connected layer. The neural network NN may further include an activation layer and may further include other types of layers performing operations.

Each of the plurality of layers L1 to Ln may receive an input image that is received or a feature map generated by a previous layer, as an input feature map, and may calculate an output feature map based on the input feature map. Here, the feature map may denote data representing various features of the input data. Feature maps, that is, first, second, third, and $n^{th}$ feature maps FM1, FM2, FM3, and FMn may have, for example, a two-dimensional (2D) matrix form or a three-dimensional (3D) matrix (or referred to as a tensor) form including a plurality of feature values. Each of the first second, third, and $n^{th}$ feature maps FM1, FM2, FM3, and FMn may have width W (referred to as columns), height H (referred to as rows), and depth D, which may respectively correspond to an x axis, a y axis, and a z axis of coordinates. Here, the depth D may be referred to as the number of channels.

The first layer L1 may generate the second feature map FM2 by forming a convolution of the first feature map FM1 with a weight map WM. The weight map WM may have a 2D matrix form or a 3D matrix form including a plurality of weight values. The weight map WM may be referred to as a kernel. The weight map WM may filter the first feature map FM1 and may be referred to as a filter or a kernel. A depth, that is, the number of channels, of the weight map WM may be the same as the depth, that is, the number of channels, of the first feature map FM1, and the same channels of the weight map WM and the first feature map FM1 may be formed as a convolution.

The weight map WM may be shifted via a crossing method using the first feature map FM1 as a sliding window. During each shift, each of weights included in the weight map WM may be multiplied and added to all feature values in a region overlapping the first feature map FM1. As the convolution of the first feature map FM1 with the weight map WM is formed, one channel of the second feature map FM2 may be generated. FIG. 2 illustrates one example of a weight map WM. However, in reality, a plurality of weight maps may form a convolution with the first feature map FM1 to generate a plurality of channels of the second feature map FM2. That is, the number of channels of the second feature map FM2 may correspond to the number of weight maps.

The second layer L2 may generate the third feature map FM3 by changing a spatial size of the second feature map FM2 through pooling. Pooling may be referred to as sampling or down-sampling. A 2D pooling window WD may be shifted on the second feature map FM2 in units of a size of the pooling window WD, and a maximum value of feature values (or an average value of feature values) of an area overlapping the pooling window WD may be selected. Accordingly, the third feature map FM3 that is changed from the second feature map FM2 in terms of the spatial size may be generated. The number of channels of the third feature map FM3 and the number of channels of the second feature map FM2 may be the same.

According to an embodiment, the second layer L2 is not limited to a sampling layer or a pooling layer. For example, the second layer L2 may be a convolution layer, similar to the first layer L1. The second layer L2 may generate the third feature map FM3 by forming a convolution of the second feature map FM2 with a weight map. In this case, the weight map on which the second layer L2 performs the convolution operation may be different from the weight map WM on which the first layer L1 performs the convolution operation. Based on the plurality of layers including the first layer L1 and the second layer L2, the $n^{th}$ feature map FMn may be generated via the $n^{th}$ layer Ln.

Figure 3:
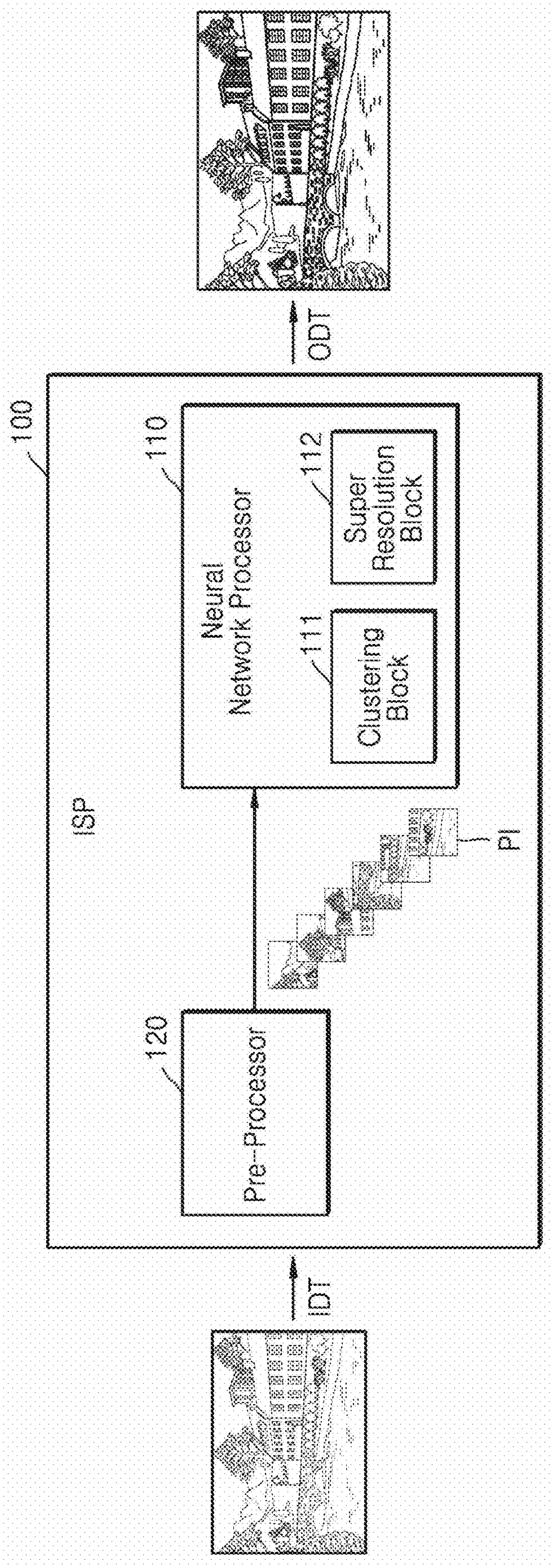
FIG. 3 is a block diagram of an image processing device according to an embodiment.

FIG. 3 is a block diagram of an image processing device 100 according to an embodiment. The image processing device 100 and a neural network processor 110 of FIG. 3 may correspond to the image processing device 100 and the neural network processor 110 of FIG. 1, and thus, the same aspects are not repeated.

The image processing device 100 may capture an image and process the captured image. In some cases, the image processing device 100 may process an image stored or received from the memory. In some cases, the image processing device 100 may be mounted in an electronic device or in an electronic device provided as a component of a vehicle, furniture, a manufacturing facility, a door, various measuring devices, etc.

Referring to FIG. 3, the image processing device 100 may include a pre-processor 120 and the neural network processor 110. The pre-processor 120 may receive an input image IDT and may generate patch images PI with respect to the input image IDT. The pre-processor 120 may generate the patch images PI by splitting the input image IDT.

The pre-processor 120 may split the input image IDT into the patch images PI having predetermined sizes. For example, the patch images may have the same sizes as each other or different sizes from each other. For example, the pre-processor 120 may split the input image IDT into six patch images PI. The plurality of patch images PI may be input to the neural network processor 110.

The neural network processor 110 may perform an image processing operation on each of the patch images PI. For example, the neural network processor 110 may perform a neural network operation on the patch images PI. Referring to FIG. 3, a neural network implemented in the neural network processor 110 may include a clustering block 111 and a super-resolution block 112. According to an embodiment, the pre-processor 120 and the neural network processor 110 may be realized as a single semiconductor chip or a plurality of semiconductor chips.

The neural network processor 110 may perform a clustering operation to generate a high-resolution image. In some cases, the clustering block 111 may receive the patch images PI. The clustering block 111 may cluster the plurality of patch images PI and may differentiate each of the plurality of patch images PI is a reference patch image or a query patch image. The clustering block 111 may cluster the plurality of patch images PI according to the number of clusters such that similar patch images form a cluster. For example, the clustering block 111 may cluster a first patch image and a second patch image into a first cluster, a third patch image and a fourth patch image into a second cluster, and a fifth patch image and a sixth patch image into a third cluster. However, the clustering block 111 is only an example, and the disclosure is not necessarily limited thereto.

The clustering block 111 may differentiate one or more patch images PI included in each cluster into the reference patch image and the query patch image. For example, the clustering block 111 may generate differentiation data for differentiating whether a patch image PI is the reference patch image or the query patch image. The clustering block 111 may differentiate a patch image PI best representing a feature of each cluster as the reference patch image of each cluster. For example, the clustering block 111 may differentiate the first patch image best representing the feature of the first cluster as the reference patch image of the first cluster. The clustering block 111 may differentiate a patch image PI of each cluster that is not the reference patch image as the query patch image. The clustering block 111 may differentiate the second patch image as the query patch image of the first cluster.

The neural network processor 110 may perform an image processing operation including a quantization operation, in order to generate a high-resolution image. The super-resolution block 112 may perform various operations for performing image processing on each of the patch images PI. The super-resolution block 112 may perform quantization on each of the patch images PI.

According to an embodiment, the super-resolution block 112 may receive feature maps corresponding to the patch images PI. The super-resolution block 112 may perform various operations for performing image processing on the feature maps. In order to perform image processing on the feature map corresponding to each of the patch images PI, the super-resolution block 112 may perform quantization on parameters. For example, the super-resolution block 112 may perform quantization on activations and weights for performing a neural network operation on each of the patch images PI.

The super-resolution block 112 may perform quantization on the reference patch image and the query patch image using different numbers of bits based on whether the patch image PI of each cluster is a reference patch image or a query patch image. According to an embodiment, the super-resolution block 112 may perform quantization on a feature map corresponding to the reference patch image, by using a relatively increased number of bits. For example, when a target patch image, on which image processing is to be performed, is the reference patch image, the super-resolution block 112 may perform quantization on the feature map corresponding to the target patch image, based on a first number of bits. This operation above may denote that quantization may be performed on the feature map corresponding to the target patch image by a precision of the first number of bits.

The super-resolution block 112 may perform quantization on a reference feature map corresponding to the reference patch image, based on the first number of bits. A cluster including a target patch image, on which image processing is to be performed, may be referred to as a target cluster. When the target patch image is the reference patch image, the target patch image may be referred to as a target reference patch image, and a feature map corresponding to the target reference patch image may be referred to as a target reference feature map. When the target patch image is the query patch image, the target patch image may be referred to as a target query patch image, and a feature map corresponding to the target query patch image may be referred to as a target query feature map.

According to an embodiment, the super-resolution block 112 may perform quantization on a feature map corresponding to the query patch image, by using a relatively small number of bits. For example, when the target patch image, on which image processing is to be performed, is the query patch image, the super-resolution block 112 may perform quantization on the feature map corresponding to the query patch image, based on a second number of bits. That is, the super-resolution block 112 may perform quantization on the target query feature map corresponding to the target query patch image, based on the second number of bits. According to an embodiment, the second number of bits may be less than the first number of bits. According to an embodiment, the super-resolution block 112 may perform quantization using different numbers of bits based on the cluster including the target patch image and whether a patch image is the reference patch image or the query patch image.

The neural network processor 110 may generate output patch images by performing image processing operations on the patch images PI. According to an embodiment, the image processing device 100 may include a merger. The merger may generate an output image ODT by merging the output patch images. However, the disclosure is not necessarily limited thereto.

When a neural network operation is performed to process a low-resolution image into a high-resolution image, a large number of computational resources are required. When the image processing device 100 performs the neural network operation, the image processing device 100 may perform quantization on the reference patch image using an increased number of bits and may perform quantization on the query patch image using a relatively decreased number of bits. Accordingly, the number of computational resources may be reduced and the speed of image processing may be improved.

Figure 4:
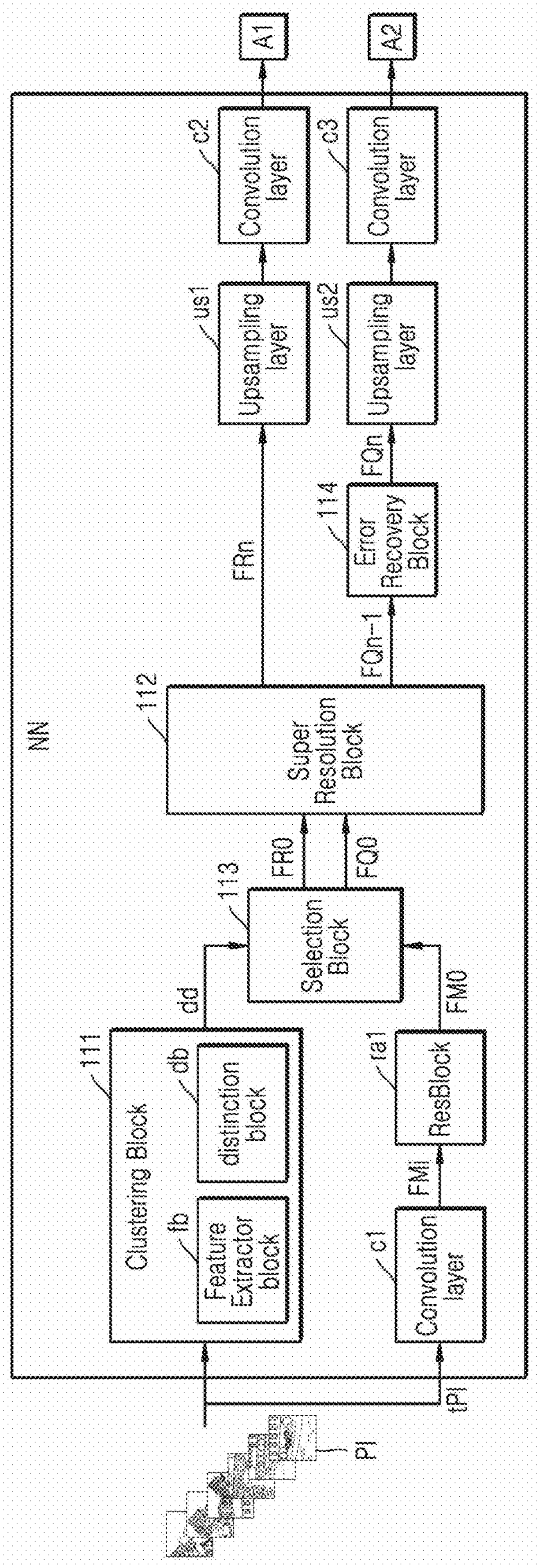
FIG. 4 shows a neural network according to an embodiment.

FIG. 4 shows the neural network NN according to an embodiment. The neural network NN in FIG. 4 may be implemented in the neural network processor 110 of FIG. 3. Accordingly, aspects of the neural network NN that are the same as described previously are omitted herein.

According to an embodiment, the neural network NN may perform an image processing operation. The neural network NN may be trained to perform a super-resolution image processing operation that results in generation of a high-resolution image from a low-resolution image.

The neural network NN may include the clustering block 111, a residual block ra1, convolution layers c1, c2, and c3, a selector 113, the super-resolution block 112, an error recovery block 114, upsampling layers us1 and us2. The neural network NN may calculate a feature value of the patch image PI via the clustering block 111, the residual block ra1, the convolution layers c1, c2, and c3, the selector 113, the super-resolution block 112, the error recovery block 114, and the upsampling layers us1 and us2. For example, a block may include a convolution layer, an activation layer, etc.

According to an embodiment, the clustering block 111 may receive the patch images PI. The clustering block 111 may cluster the patch images according to the number of clusters such that similar patch images form a cluster. The clustering block 111 may include a feature extraction block fb and a differentiation block db. In some aspects of the present disclosure, differentiation block db and distinction block db may be used interchangeably.

The feature extraction block fb may extract a feature of each of the patch images PI. The feature extraction block fb may generate feature information of the patch images PI through a feature extraction process. For example, the feature extraction block fb may generate a feature vector indicating a feature of each of the patch images PI. The feature extraction block fb may include a plurality of layers. However, the feature extraction block fb is not necessarily limited thereto. For example, the feature extraction block fb may include feature extractors, such as a local binary pattern (LBF), scale invariant feature transform (SIFT), visual geometry group (VGG), etc. The feature extraction block fb may include a combination of a number of feature extractors. According to an embodiment, the feature extraction block fb may be omitted from the clustering block 111.

The differentiation block db may cluster the patch images PI by using feature information of each of the patch images PI and may differentiate the patch images PI of each cluster into a reference patch image and a query patch image. For example, the differentiation block db may generate differentiation data dd for differentiating whether a patch image is the reference patch image or the query patch image. The differentiation block db may generate the differentiation data dd by using the feature vector. The clustering block 111 will be described in detail below with reference to FIG. 5.

The differentiation block db may include a plurality of layers. The differentiation block db may generate the differentiation data dd by applying a softmax function and a transpose softmax function. However, the differentiation block db is not necessarily limited thereto. The differentiation block db may use various algorithms to cluster the patch images PI and generate the differentiation data dd. For example, the differentiation block db may use algorithms, such as a k-means algorithm, a k-medoids algorithm, a density-based spatial clustering of applications with noise dbscan, etc.

Each of the patch images PI may be input to the convolution layer c1. For example, a target patch image tPI, on which an image processing device is to perform an image processing operation, may be input to the convolution layer c1. The convolution layer c1 may generate a target feature map FMi by performing a convolution operation on the target patch image tPI.

The target feature map Fmi may be input to a residual block ra1. The residual block ra1 may perform a residual operation on the target feature map Fmi and may generate a target feature map FM0. The residual block ra1 may perform quantization on the target feature map Fmi, based on a first number of bits.

The selector 113 may receive the differentiation data dd and the target feature map FM0. The selector 113 may determine a feature map type of the target feature map FM0, based on the differentiation data dd. The selector 113 may determine whether the target feature map FM0 is a reference feature map or a query feature map. The reference feature map may denote a feature map corresponding to the reference patch image, and the query feature map may denote a feature map corresponding to the query feature image.

The differentiation data dd may include information about the cluster the reference patch image and the query patch image are included, and thus, the selector 113 may determine, using the differentiation data dd, the cluster including the reference feature map and the query feature map corresponding to the target feature map FM0.

When the target feature map FM0 corresponds to the reference feature map, the selector 113 may output a target feature map FR0. When the target feature map FM0 corresponds to the query feature map, the selector 113 may output a target feature map FQ0. The selector 113 may determine the feature map type of the target feature map FM0 and may output the target feature map FR0 or FQ0 to the super-resolution block 112.

The super-resolution block 112 may receive the target feature map FR0 or FQ0 corresponding to the target patch image tPI. The super-resolution block 112 may perform various operations to perform image processing of the target feature map FR0 or FQ0. The super-resolution block 112 may perform quantization on the target feature maps FR0 and FQ0 using different bits according to the feature map type of the target feature maps FR0 and FQ0.

According to an embodiment, when the super-resolution block 112 receives the target feature map FR0, which is the reference feature map, the super-resolution block 112 may perform quantization on the target feature map FR0 using a relatively large number of bits. For example, the super-resolution block 112 may perform quantization on the target feature map FR0 based on a first number of bits. The super-resolution block 112 may perform the quantization operation and other image processing operations on the target feature map FR0 and may output a target feature map FRn. The target feature map FRn may be generated as an output patch image A1 sequentially through the upsampling layer us1 and the convolution layer c2.

According to an embodiment, when the super-resolution block 112 receives the target feature map FQ0, which is the query feature map, the super-resolution block 112 may perform quantization on the target feature map FQ0 by using a relatively small number of bits. For example, the super-resolution block 112 may perform quantization on the target feature map FQ0 based on a second number of bits. The second number of bits may be less than the first number of bits. The super-resolution block 112 may perform the quantization operation and other image processing operations on the target feature map FQ0 and may output a target feature map FQn−1. The feature map corresponding to the query patch image may be quantized based on a relatively decreased number of bits, and thus, a quantization error may occur. The quantization error occurring when the feature map corresponding to the query patch image is quantized may have to be recovered.

The target feature map FQ0 may be quantized based on the relatively decreased number of bits, and thus, a quantization error may occur. The error recovery block 114 may recover a quantization error with respect to the target feature map FQn−1 and may output a target feature map FQn. According to an embodiment, the error recovery block 114 may recover a quantization error of the target feature map FQn−1, based on an auxiliary feature map. The auxiliary feature map may denote a feature map corresponding to a reference patch image included in a target cluster. The auxiliary feature map may denote a feature map generated by performing quantization on the feature map corresponding to the reference patch image included in the target cluster. The target cluster may be a cluster including a target patch image.

The target feature map FQn may be generated as an output patch image A2 sequentially through the upsampling layer us2 and the convolution layer c3. FIG. 4 illustrates that one error recovery block 114 is included in the neural network NN. However, the error recovery block 114 is not necessarily limited thereto, and two or more error recovery blocks 114 may be included in the neural network NN. The error recovery block 114 will be described in detail below with reference to FIGS. 9A and 9B.

Figure 5:
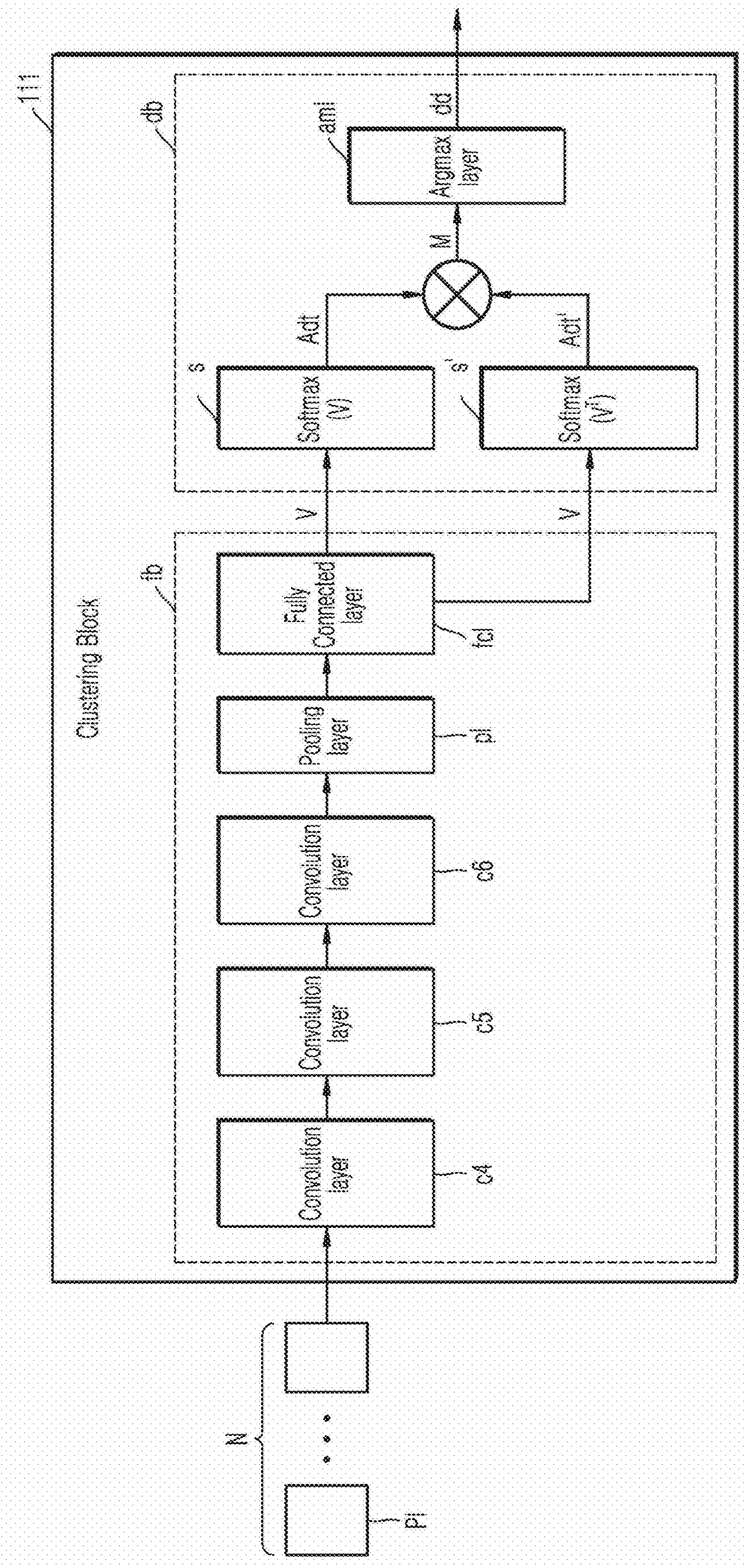
FIG. 5 shows a clustering block according to an embodiment.

FIG. 5 describes the clustering block 111 according to an embodiment. The same aspects as described above will not be repeated.

Referring to FIG. 5, the clustering block 111 may include a plurality of layers. The clustering block 111 may include a feature extraction block fb and a differentiation block db.

The clustering block 111 may receive the patch images PI. For example, the clustering block 111 may receive N (N is a positive number) patch images PI. The feature extraction block fb may generate feature information of the patch images PI through a feature extraction process. For example, the feature extraction block fb may generate a feature vector V indicating a feature of each of the patch images PI. The feature extraction block fb may include a plurality of layers.

Referring to FIG. 5, the feature extraction block fb may include convolution layers c4, c5, and c6, a pooling layer p1, and a fully connected layer fc1. The feature extraction block fb may perform, on each of the patch images PI, an operation corresponding to each of the convolution layer c4, the convolution layer c5, the convolution layer c6, the pooling layer p1, and the fully connected layer fc1, and may generate the feature vector V indicating the feature of each of the patch images PI.

The differentiation block db may cluster the patch images PI using the feature vector V of each of the patch images PI and may differentiate a reference patch image and a query patch image of each cluster. The differentiation block db may include a plurality of layers. The differentiation block db may include a softmax layer s, a transpose softmax layer s', a multiplier, and an argmax layer am1.

The softmax layer s may generate first classification data Adt by applying a softmax function operation to the feature vector V corresponding to each of the patch images PI.

The transpose softmax layer s' may generate second classification data Adt' by applying a transpose softmax function operation to the feature vector V corresponding to each of the patch images PI. The transpose softmax function may denote implementation of a softmax function by having a transpose matrix of the feature vector V as an input.

A multiplication value M obtained by multiplying the first classification data Adt by the second classification data Adt' may be an input of the argmax layer am1. The argmax layer am1 may generate differentiation data dd by applying an argmax function operation to the multiplication value M.

Figure 6:
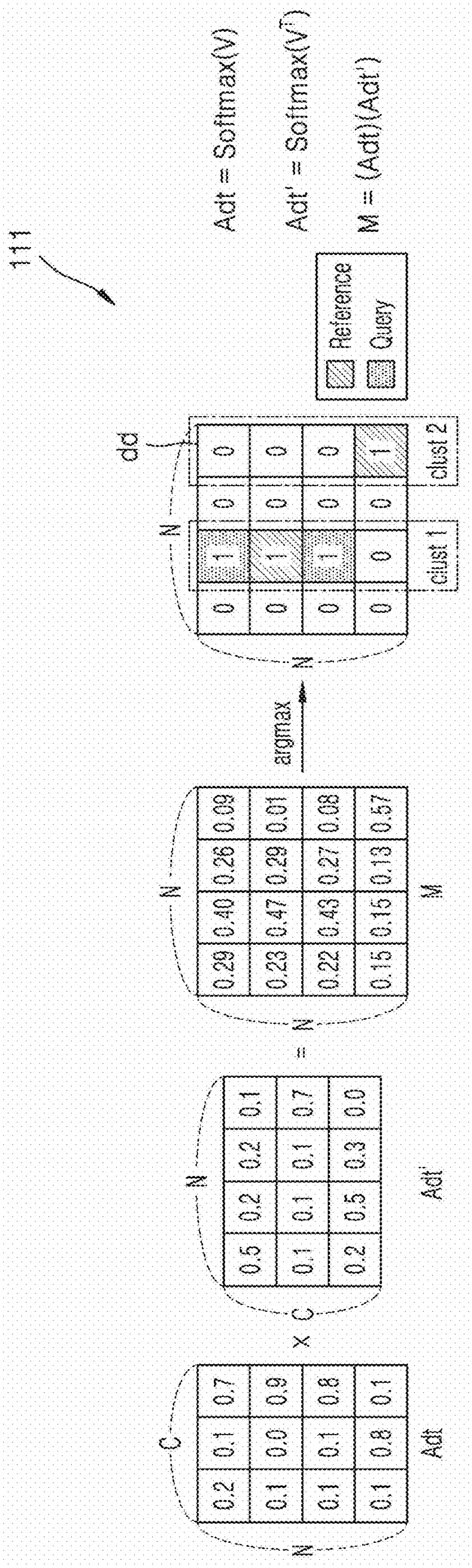
FIG. 6 shows an exemplary operation of a differentiation block according to an embodiment.

FIG. 6 describes an exemplary operation of the differentiation block db according to an embodiment. The same aspects as described with reference to FIG. 5 are omitted. In FIG. 6, C may indicate the number of clusters and N may indicate the number of patch images.

Referring to FIGS. 5 and 6, the number of patch images may be 4 and the number of clusters may be 3. However, FIG. 6 illustrates an example in which the number of patch images is 4 and the number of clusters is 3, and the number of patch images and the number of clusters are not necessarily limited thereto and may vary. The number of clusters may be predetermined or determined based on a training process. The differentiation block db may generate first classification data Adt by applying a softmax function operation to the feature vector V corresponding to each of the patch images PI. The first classification data Adt may be represented as a matrix.

The differentiation block db may generate second classification data Adt' by applying a transpose softmax function operation to the feature vector V corresponding to each of the patch images PI. The second classification data Adt' may be represented as a matrix. The differentiation block db may generate differentiation data dd by applying an argmax operation to a multiplication value M obtained by multiplying the first classification data Adt by the second classification data Adt'.

Accordingly, based on FIG. 6, with reference to the exemplary differentiation data dd, a first cluster may include a first patch image, a second patch image, and a third patch image. A reference patch image of the first cluster may be the second patch image. Query patch images of the first cluster may be the first patch image and the third patch image. A second cluster may include a fourth patch image. A reference patch image of the second cluster may be the fourth patch image, and there may be no query patch image of the second cluster. A third cluster may include no patch image.

Figure 7:
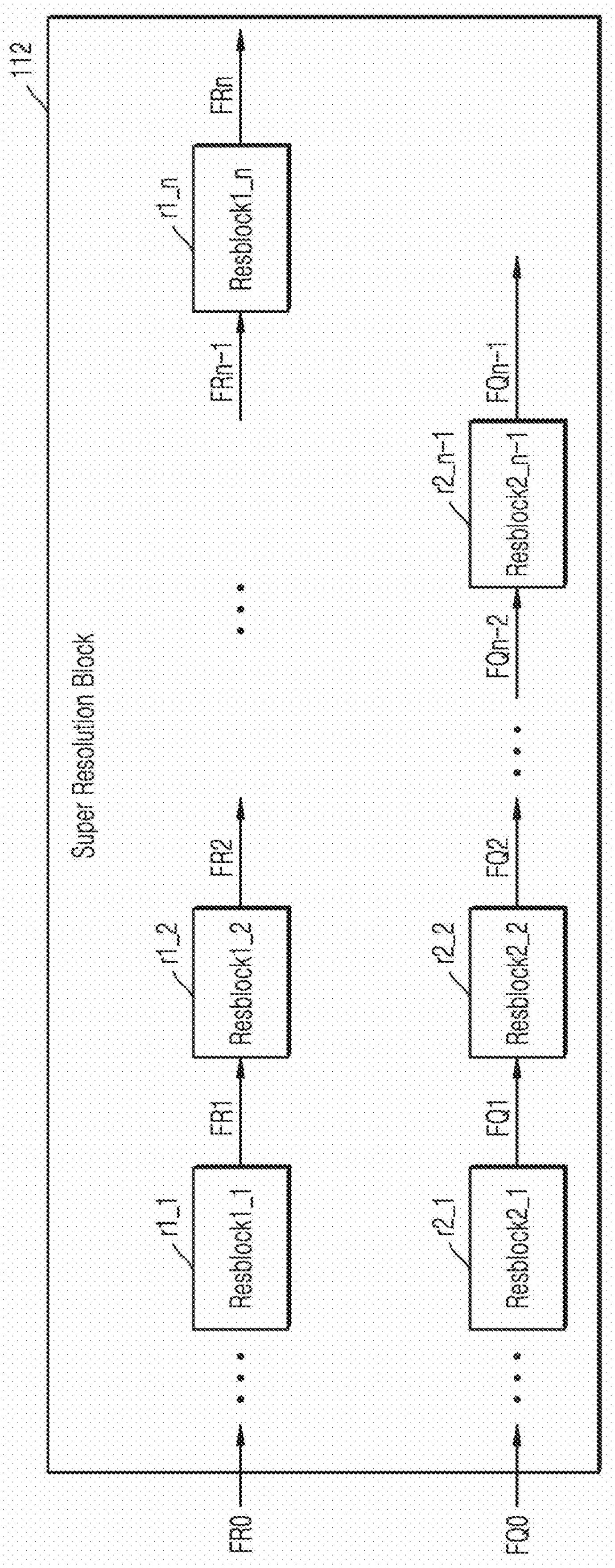
FIG. 7 shows a super-resolution block according to an embodiment.

FIG. 7 describes a super-resolution block 112 according to an embodiment. The super-resolution block 112 of FIG. 7 may correspond to the super-resolution block 112 of FIG. 4, and thus, the same aspects are not repeated.

The super-resolution block 112 may receive a target feature map FR0 or FQ0 corresponding to a target patch image. The super-resolution block 112 may include a plurality of residual blocks. The super-resolution block 112 may include one or more first residual blocks r1 and one or more second residual blocks r2.

According to an embodiment, the number of one or more second residual blocks r2 included in the super-resolution block 112 may be less than the number of one or more first residual blocks r1 included in the super resolution block 112. For example, the super-resolution block 112 may include n (n is a positive number) first residual blocks r1 and n−1 second residual blocks r2. However, the super-resolution block 112 is not necessarily limited thereto. For example, the number of one or more first residual blocks r1 included in the super-resolution block 112 may be the same as the sum of the number of one or more second residual blocks r2 included in the super-resolution block 112 and the number of error recovery blocks (for example, the error recovery blocks 114 of FIG. 4).

According to an embodiment, the one or more first residual blocks r1 may perform quantization on a feature map based on a first number of bits. Each of the one or more first residual blocks r1 may perform quantization on a feature map input to each of the one or more first residual blocks r1 based on the first number of bits. A reference feature map may be input to a first residual block r1_1. When the target feature map FR0 is a reference feature map, each of the one or more first residual blocks r1 may perform quantization on the reference feature map, based on the first number of bits.

Each of the one or more first residual blocks r1 may perform quantization on reference activations and reference weights with respect to each of the feature maps respectively input to the one or more first residual blocks r1. Each of the one or more first residual blocks r1 may perform quantization on the reference activations and the reference weights based on the first number of bits. For example, the one or more first residual blocks r1 may perform quantization on the target feature map FR0 based on an 8-bit number. However, the disclosure is not necessarily limited thereto, and the target feature map FR0 may be quantized based on various bit numbers.

For example, the first residual block r1_1 may perform quantization on the target feature map FR0, based on the first number of bits, and may output a target feature map FR1. The target feature map FR1 may be an input of a first residual block r1_2. Also, the first residual block r1_2 may perform quantization on a target feature map FR1, based on the first number of bits, and may output a target feature map FR2. Similarly, a target feature map FRn−1 may be an input of a first residual block r1_n, and the first residual block r1_n may perform quantization on the target feature map FRn−1, based on the first number of bits, and may output a target feature map FRn. The target feature map FRn may be input to an upsampling layer (for example, the upsampling layer us1 of FIG. 4).

According to an embodiment, the one or more second residual blocks r2 may perform quantization on a feature map based on a second number of bits. Each of the one or more second residual blocks r2 may perform quantization on the feature map input to each of the one or more second residual blocks r2 based on the second number of bits. The second number of bits may be less than the first number of bits. A query feature map may be input to a second residual block r1_2. When the target feature map FQ0 is the query feature map, each of the one or more second residual blocks r2 may perform quantization on the query feature map that is input based on the second number of bits.

For example, a second residual block r2_1 may perform quantization on the target feature map FQ0, based on the second number of bits, and may output a target feature map FQ1. The target feature map FQ1 may be an input of a second residual block r2_2, and the second residual block r2_2 may perform quantization on the target feature map FQ1 based on the second number of bits, and may output a target feature map FQ2. Similarly, a target feature map FQn−2 may be an input of a second residual block r2_n−1, and the second residual block r2_n−1 may perform quantization on the target feature map FQn−2 based on the second number of bits, to output a target feature map FQn−1. The target feature map FQn−1 may be input to the error recovery bock (for example, the error recovery block 114 of FIG. 4).

Each of the one or more second residual blocks r2 may perform quantization on query activations and query weights with respect to each of the feature maps respectively input to the one or more second residual blocks r2. The one or more second residual blocks r2 may perform quantization on each of the query activations and the query weights by using different numbers of bits.

According to an embodiment, each of the one or more second residual blocks r2 may perform quantization on the query activations, based on the second number of bits. Each of the one or more second residual blocks r2 may perform quantization on the query weights, based on a third number of bits. The third number of bits may be less than the first number of bits and greater than the second number of bits.

For example, the third number of bits may be an intermediate value between the first number of bits and the second number of bits. For example, the second residual block r2_1 may perform quantization on the query activations of the target feature map FQ0, based on a 4-bit number. The second residual block r2_1 may perform quantization on the query weights of the target feature map FQ0, based on a 6-bit number. However, the disclosure is not necessarily limited thereto, and the query activations and the query weights may be quantized by using various bit numbers.

When an image processing device performs a neural network operation, the image processing device may perform quantization on a feature map corresponding to a reference patch image by using an increased number of bits and may perform quantization on a feature map corresponding to a query patch image by using a relatively decreased number of bits. Thus, the computational amount of the neural network may be reduced.

Figure 8:
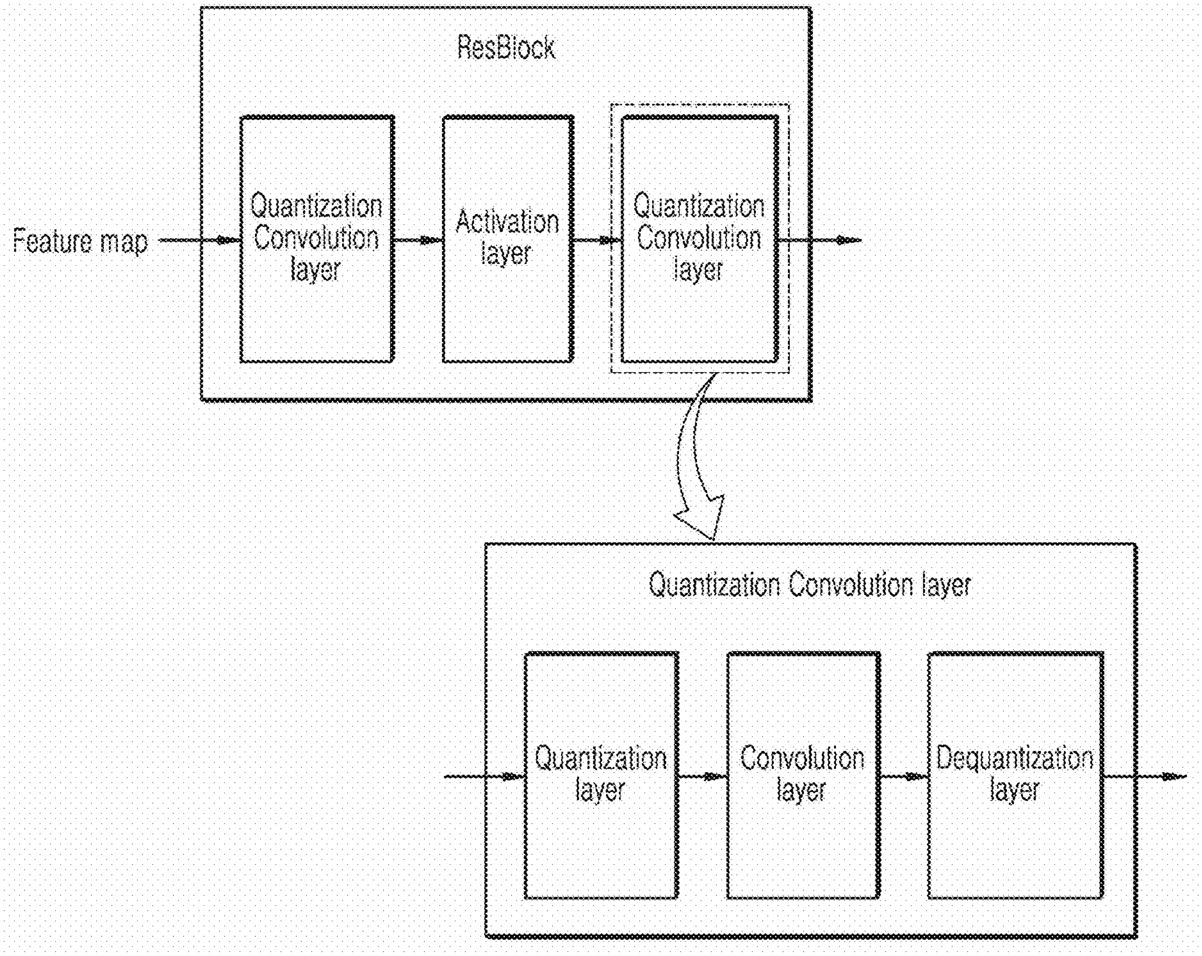
FIG. 8 shows a residual block according to an embodiment.

FIG. 8 describes a residual block according to an embodiment. The residual block of FIG. 8 may be implemented as a first residual block (for example, the first residual block of FIG. 7) and a second residual block (for example, the second residual block of FIG. 7).

The residual block may include one or more quantization convolution layers and one or more activation layers. For example, the residual block may include two quantization convolution layers and one activation layer. However, the number of quantization convolution layers and the number of activation layers are not necessarily limited thereto.

The quantization convolution layer may perform a quantization convolution operation on an input feature map. The quantization convolution layer may include one or more quantization layers, one or more convolution layers, and one or more dequantization layers. For example, the quantization convolution layer may include one quantization layer, one convolution layer, and one dequantization layer, but is not necessarily limited thereto. The quantization layer may perform a quantization operation on parameters of an input feature map. The dequantization layer may perform a dequantization operation on the parameters of the input feature map.

The activation layer may perform an activation function on a feature map that is input to the activation layer. For example, the activation layer may perform an operation based on a rectified linear unit (ReLU) function. However, the activation layer is not necessarily limited thereto and may perform operations based on various activation functions, such as a sigmoid function, etc.

The quantization convolution operation and the activation function may be performed on each of the inputs of the residual block. The residual block may perform the quantization convolution operation and the activation function operation on the feature map that is input to the residual block, to perform quantization on the feature map. For example, according to a feature map type of the feature map input to the residual block, different numbers of bits may be used for performing quantization.

Figure 9A:
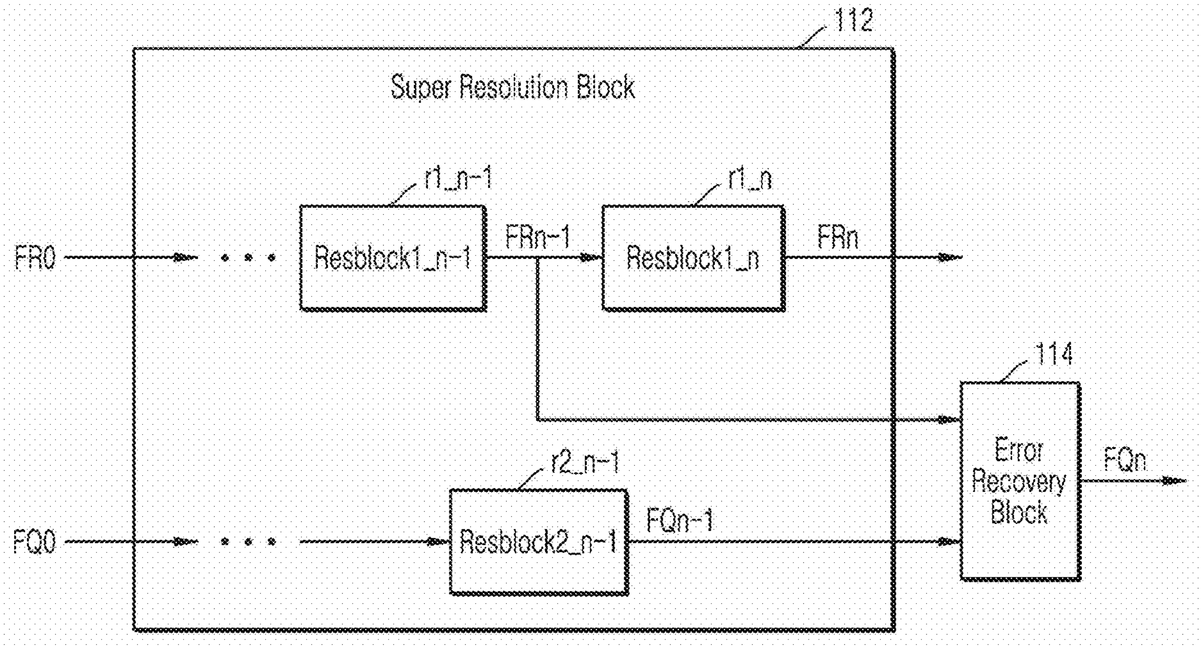
FIG. 9A shows an error recovery block according to an embodiment.

FIG. 9A describes an error recovery block according to an embodiment. Aspects of the super-resolution block 112 and the error recovery block 114 that have already been described are omitted herein for brevity.

Referring to FIG. 9A, the neural network NN may include the super-resolution block 112 and the error recovery block 114. The error recovery block 114 may recover a quantization error with respect to a query patch image. The error recovery block 114 may recover a quantization error of a query feature map corresponding to the query patch image. The error recovery block 114 may recover a quantization error with respect to a target query patch image, on which image processing is to be performed, from among query patch images included in a target cluster.

The super-resolution block 112 may perform quantization on a target feature map FQ0, which is a query feature map, and outputs a target feature map FQn−1. The error recovery block 114 may recover a quantization error of the target feature map FQn−1 which is a query feature map. In other words, the error recovery block 114 may recover the quantization error of the target feature map FQn−1, on which quantization is performed by the super-resolution block 112, and may output a target feature map FQn.

According to an embodiment, the error recovery block 114 may recover the quantization error of the target feature map FQn−1 based on an auxiliary feature map. The auxiliary feature map may denote a feature map corresponding to a reference patch image included in the target cluster. The auxiliary feature map may denote a feature map generated by performing quantization on the feature map corresponding to the reference patch image included in the target cluster. The auxiliary feature map may be quantized from first residual blocks, and thus, may be quantized by using an increased number of bits.

For example, the auxiliary feature map may be output from a block corresponding to a second residual block outputting the query feature map that is input to the error recovery block 114. The auxiliary feature map may be output from the first residual block corresponding to the second residual block. For example, a second residual block r2n−1 may output the target feature map FQn−1, which is the query feature map, and the second residual block r2n−1 may correspond to a first residual block r1n−1. A reference feature map FRn−1 may be provided to the error recovery block 114 as the auxiliary feature map. The error recovery block 114 may recover the quantization error of the target feature map FQn−1, based on the reference feature map FRn−1.

FIG. 9A illustrates that there is one error recovery block 114. However, the error recovery block 114 is not necessarily limited thereto, and there may be one or more error recovery blocks 114 included in an image processing device. The quantization error with respect to the query feature map may be recovered by using the auxiliary feature map quantized by using an increased number of bits, and thus, the quantization error of the query feature map may be recovered efficiently and with high accuracy.

Figure 9B:
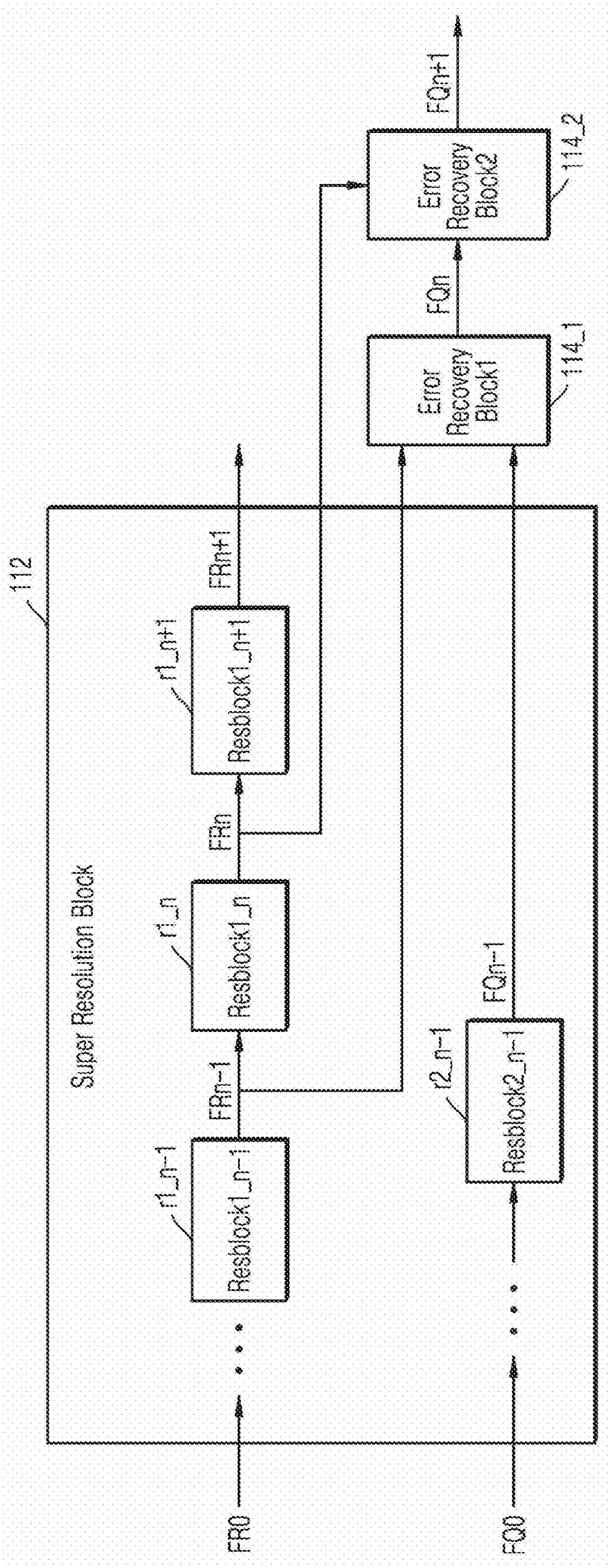
FIG. 9B describes a case where there is a plurality of error recovery blocks according to an embodiment.

FIG. 9B describes a case where there is a plurality of error recovery blocks according to an embodiment. Compared to FIG. 9A, a neural network NN of FIG. 9B may include two error recovery blocks. Repeated descriptions with respect to the error recovery block are omitted herein.

Referring to FIG. 9B, the neural network NN may include a first error recovery block 114_1 and a second error recovery block 114_2. The first error recovery block 114_1 may recover a quantization error of a target feature map FQn−1 and may output a target feature map FQn. The second error recovery block 114_2 may recover a quantization error of the target feature map FQn and may output a target feature map FQn+1. The second error recovery block 114_2 may recover the quantization error of the target feature map FQn output from the first error recovery block 114_1. The target feature map FQn+1 may be generated as an output patch image sequentially through an upsampling layer and a convolution layer.

According to an embodiment, the number of one or more first residual blocks r1 included in the super-resolution block 112 may be the same as the sum of the number of one or more second residual blocks r2 included in the super-resolution block 112 and the number of error recovery blocks 114_1 and 114_2. For example, the number of first residual blocks r1 included in the super-resolution block 112 may be n+1. The number of second residual blocks r2 included in the super-resolution block 112 may be n−1, and the number of error recovery blocks 114_1 and 114_2 may be two, and thus, the sum thereof of may be n+1.

According to an embodiment, the error recovery blocks 114_1 and 114_2 may recover the quantization error of the target feature map based on an auxiliary feature map. For example, the auxiliary feature map may be output from a first residual block r1_n−1 corresponding to a second residual block r2_n−1 outputting the query feature map FQn−1 input to the first error recovery block 114_1. A second residual block r2n−1 may correspond to a first residual block r1n−1, and a reference feature map FRn−1 may be provided to the first error recovery block 114_1 as the auxiliary feature map. The first error recovery block 114_1 may recover the quantization error of the target feature map FQn−1 based on the reference feature map FRn−1 and may output the target feature map FQn.

For example, the auxiliary feature map may be output from a first residual block r1_n that corresponds to the first error recovery block 114_1. The first error recovery block 114_1 outputs the query feature map FQn that may be input to the second error recovery block 114_2. The first error recovery block 114_1 may correspond to the first residual block r1_n and a reference feature map FRn may be provided to the second error recovery block 114_2 as the auxiliary feature map. The second error recovery block 114_2 may recover the quantization error of the target feature map FQn, based on the reference feature map FRn, and may output the target feature map FQn+1.

Figure 10:
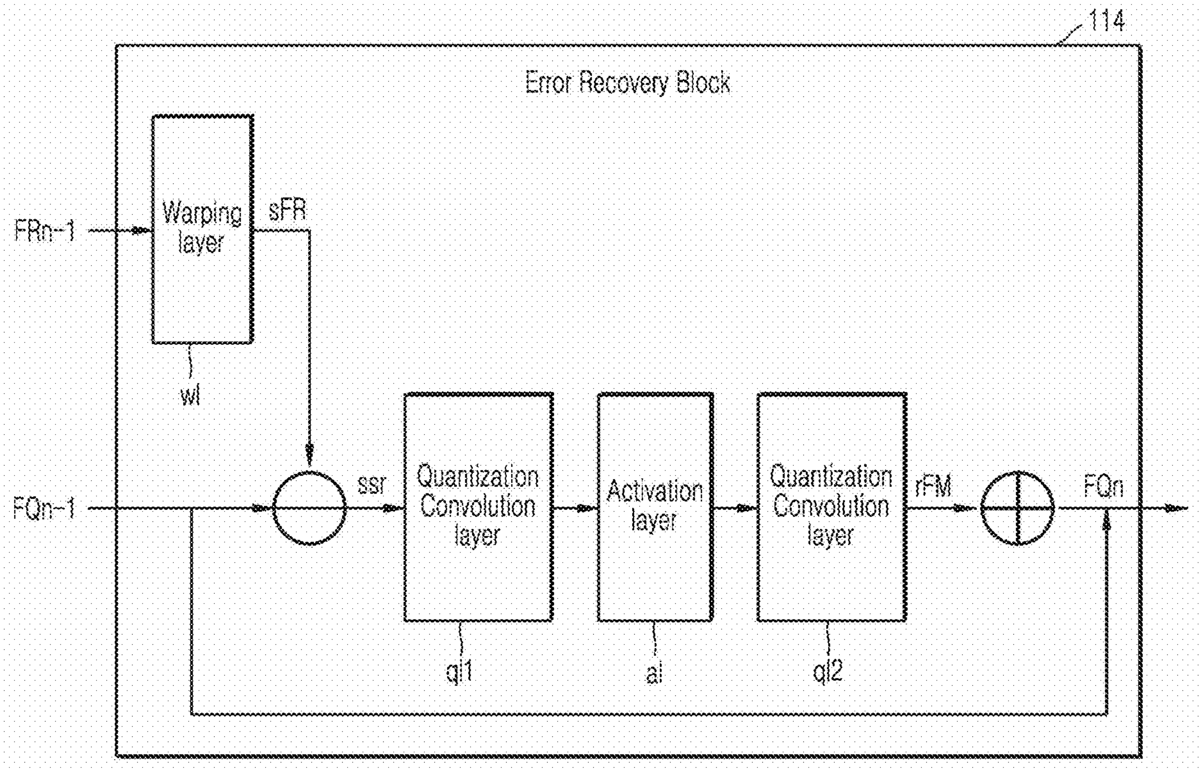
FIG. 10 describes a structure of an error recovery block according to an embodiment.

FIG. 10 describes a structure of the error recovery block 114 according to an embodiment. The error recovery block 114 of FIG. 10 may correspond to the error recovery block 114 described with reference to FIGS. 9A and 9B, and thus, the same aspects are omitted. For convenience of explanation, it is assumed that the target feature map FQn−1 may be input to the error recovery block 114 and the auxiliary feature map FRn−1 may be provided. The target feature map FQn−1 may be a query feature map and the auxiliary feature map FRn−1 may be a reference feature map.

Referring to FIG. 10, the error recovery block 114 may include a plurality of layers, a subtractor, and an adder. The plurality of layers may include one or more warping operation layers w1, one or more quantization convolution layers q11 and q12, and one or more activation layers al. For example, the error recovery block 114 may include one warping operation layer w1, two quantization convolution layers q11 and q12, and one activation layer al. However, the numbers of waring operation layers w1, convolution layers q11 and q12, and activation layers al are not necessarily limited thereto.

The warping operation layer w1 may generate an auxiliary feature map sFr warped by implementing a warping operation to the auxiliary feature map FRn−1. The warping operation layer w1 may warp the auxiliary feature map FRn−1 to the target feature map FQn−1. The warping operation may refer to an operation of aligning critical features of two images to be close to each other based on facilitating spatial transformations of input data and enabling the network to learn to adaptively alter the spatial configuration of input features. For example, the warping operation layer w1 may align the auxiliary feature map FRn−1 to correspond to the target feature map FQn−1. The warping operation layer w1 may perform a warping operation by using various warping operation methods.

The error recovery block 114 may generate a subtraction result ssr by performing a subtraction operation on the warped auxiliary feature map sFR and the target feature map FQn−1. When the subtraction operation is performed on the warped auxiliary feature map sFR and the target feature map FQn−1, a quantization error of the target feature map FQn−1 may be obtained. That is, the subtraction result ssr may indicate the quantization error of the target feature map FQn−1.

The error recovery block 114 may generate a recovery query feature map rFM by performing quantization and activation functions on the subtraction result ssr. The error recovery block 114 may generate the recovery query feature map rFM by performing quantization convolution and activation functions on the subtraction result ssr. The subtraction result ssr may be generated as the recovery query feature map rFM after the first quantization convolution layer q11, the activation layer al, and the second quantization convolution layer q12.

The error recovery block 114 may generate the recovery query feature map rFM by performing quantization on the subtraction result ssr. The error recovery block 114 may perform quantization via the first quantization convolution layer q11 and the second quantization convolution layer q12. The error recovery block 114 may perform the quantization based on a relatively increased number of bits. According to an embodiment, the error recovery block 114 may perform the quantization based on a first number of bits. For example, the error recovery block 114 may perform quantization on the subtraction result ssr based on the first number of bits via the first quantization convolution layer q11 and the second quantization convolution layer q12.

The error recovery block 114 may perform an adding operation by adding the recovery query feature map rFM to the target feature map FQn−1 and may generate a target feature map FQn. The target feature map FQn may be a query feature map in which the quantization error is recovered.

The error recovery block 114 may quantize the query feature map quantized based on a decreased number of bits by using an increased number of bits and may thus recover the quantization error of the query feature map. Thus, an image output from the image processing device may have improved quality.

Figure 11:
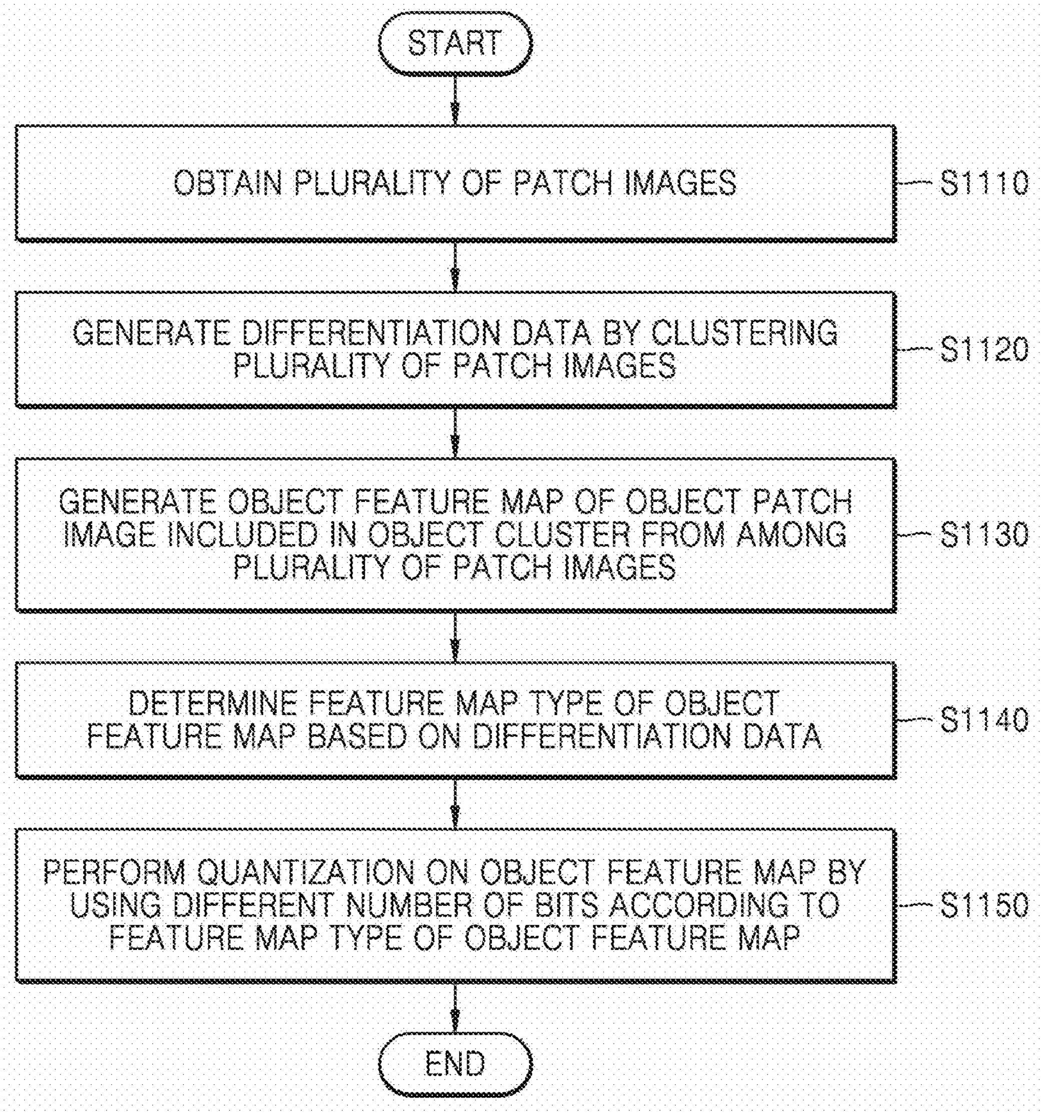
FIG. 11 is a flowchart of an image processing method according to an embodiment.

FIG. 11 is a flowchart describing an image processing method according to an embodiment. FIG. 11 is a flowchart of an operating method of an image processing device. For example, FIG. 11 is the flowchart of the image processing method of the neural network processor described with reference to FIGS. 5-10.

In operation S1110, the image processing device may obtain a plurality of patch images. The image processing device may obtain the plurality of patch images split from an input image. For example, the patch images may have the same sizes as each other. For example, the patch images may have different sizes from each other.

In operation S1120, the image processing device may cluster the plurality of patch images and may generate differentiation data. The differentiation data may be configured to differentiate whether one or more patch images included in each cluster formed by clustering the plurality of patch images correspond to reference patch images or query patch images.

The image processing device may cluster the plurality of patch images according to the number of clusters such that similar patch images form a cluster. For example, the image processing device may cluster a first patch image and a second patch image into a first cluster and a third patch image and a fourth patch image into a second cluster. However, the method of clustering the patch images via the image processing device described above is only an example, and the disclosure is not necessarily limited thereto.

The image processing device may differentiate the one or more patch images included in each cluster into a reference patch image and a query patch image. The image processing device may differentiate a patch image best representing a feature of each cluster as the reference patch image of each cluster. For example, the image processing device may differentiate the first patch image best representing a feature of the first cluster as the reference patch image of the first cluster.

The image processing device may differentiate a patch image that is not the reference patch image from among the one or more patch images included in each cluster as the query patch image. For example, the image processing device may differentiate the second patch image in the first cluster, the second patch image not being the reference patch image, as the query patch image of the first cluster.

In operation S1130, the image processing device may generate a target feature map (also referred to as an object feature map) of a target patch image (also referred to as an object patch image) included in a target cluster (also referred to as an object cluster) from among the plurality of patch images. The target patch image may denote a patch image on which the image processing device is to perform image processing. For example, the image processing device may perform a convolution operation and a residual operation on the target patch image and may generate the target feature map. FIG. 11 illustrates that operation S1130 is performed after operation S1120. However, the disclosure is not necessarily limited thereto. Operation S1130 may be simultaneously performed with operation S1120 or may be performed before operation S1120.

In operation S1140, the image processing device may determine a feature map type of the target feature map based on the differentiation data. The image processing device may determine whether the target feature map is a reference feature map or a query feature map. The reference feature map may denote a feature map corresponding to the reference patch image and the query feature map may denote a feature map corresponding to the query feature image.

The differentiation data may include information about the cluster in which the reference patch image and the query patch image are included. Thus, the image processing device may determine, by using the differentiation data, the cluster to which the reference feature map and the query feature map corresponding to the target feature map belong to.

In operation S1150, the image processing device may perform quantization on the target feature map based on a different number of bits according to a type of the target feature map. According to an embodiment, when the image processing device receives the target feature map, which is the reference feature map, the image processing device may perform quantization on the target feature map by using a relatively increased number of bits. According to an embodiment, when the image processing device receives the target feature map, which is the query feature map, the image processing device may perform quantization on the target feature map by using a relatively decreased number of bits. Hereinafter, operation S1150 is described with reference to FIG. 12.

Figure 12:
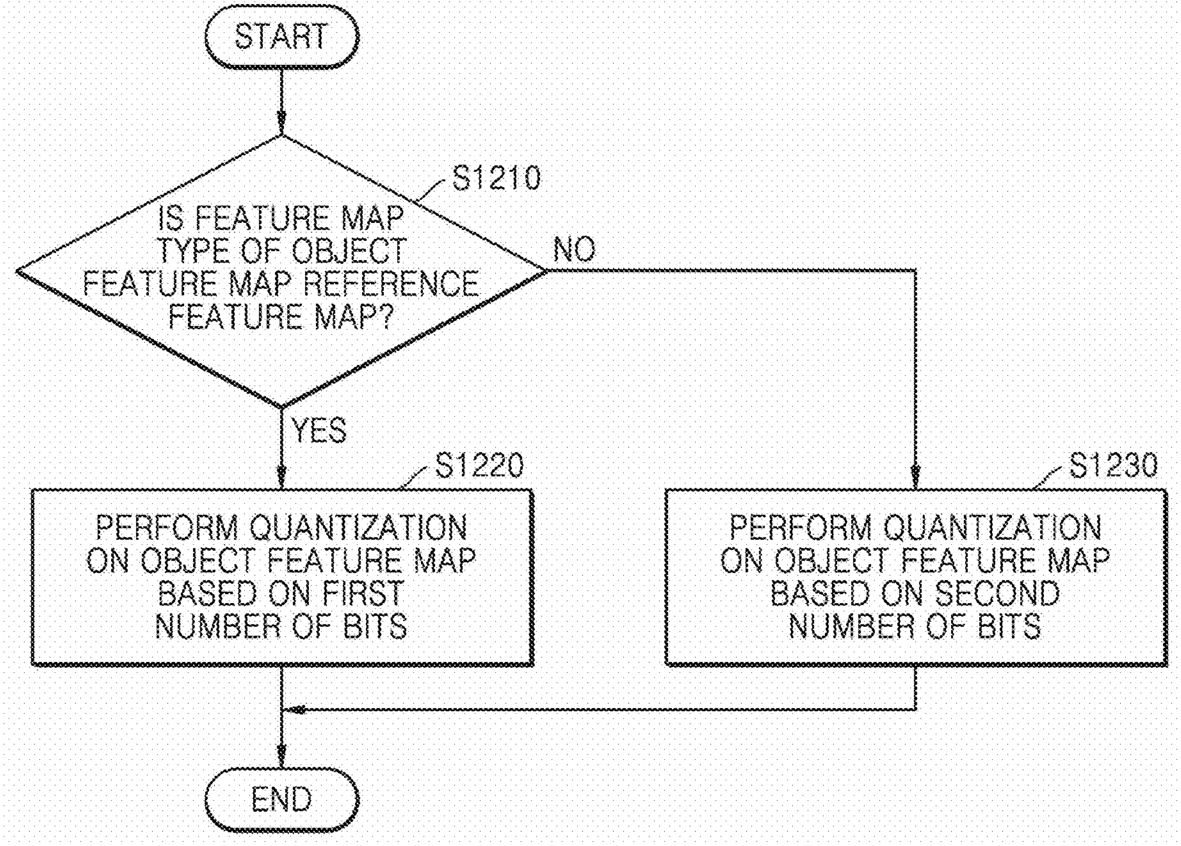
FIG. 12 is a flowchart of a method of performing quantization by an image processing device according to an embodiment.

FIG. 12 is a flowchart of a method, performed by an image processing device, for performing quantization, according to an embodiment. Operations in FIG. 12 may be included in, or are part of, operation S1150 of FIG. 11.

In operation S1210, the image processing device may determine whether or not a feature map type of a target feature map is a reference feature map. When the feature map type of the target feature map is the reference feature map, the image processing device may perform operation S1220. Additionally, when the feature map type of the target feature map is not the reference feature map, the image processing device may perform operation S1230.

In operation S1220, the image processing device may perform quantization on the target feature map based on a first number of bits. The image processing device may perform a quantization operation and other image processing operations on the target feature map. For example, when the feature map type of the target feature map is the reference feature map, the image processing device may perform quantization based on an 8-bit number. However, the image processing device is not necessarily limited thereto.

In operation S1230, the image processing device may perform quantization on the target feature map, based on a second number of bits. When the feature map type of the target feature map is not the reference feature map, the image processing device may perform quantization based on the second number of bits. When the feature map type of the target feature map is the query feature map, the image processing device may perform quantization based on the second bit number.

According to an embodiment, the second number of bits may be less than the first number of bits. For example, when the feature map type of the target feature map is a query feature map, the image processing device may perform quantization based on a 4-bit number. However, the image processing device is not necessarily limited thereto.

The image processing device may further perform an operation of recovering a quantization error on the query patch image. The image processing device may recover the quantization error of the query feature map based on an auxiliary feature map. The auxiliary feature map may denote a feature map corresponding to the reference patch image included in the target cluster. The auxiliary feature map may denote a feature map generated by performing quantization on a feature map corresponding to the reference patch image included in the target cluster.

Figure 13:
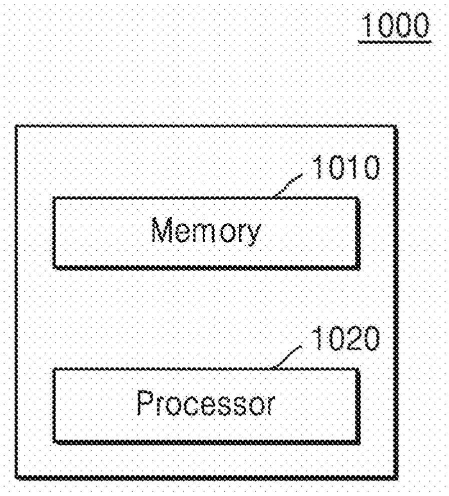
FIG. 13 is a block diagram of an image processing device according to an embodiment.

FIG. 13 is a block diagram for describing an image processing device 1000 according to an embodiment. The image processing device 1000 of FIG. 13 may correspond to the image processing device 100 of FIG. 1, and thus, the same aspects are not repeated herein.

Referring to FIG. 13, the image processing device 1000 may include a memory 1010 and a processor 1020. The memory 1010 may store one or more instructions executed by the processor 1020. For example, the memory 1010 may include an instruction, which the processor 1020 is configured to execute to perform an image processing operation on input image data.

The processor 1020 may be configured to execute one or more instructions to perform an image processing operation. A neural network (for example, the neural network NN of FIG. 4) may be implemented in the processor 1020. The processor 1020 may be configured to execute the one or more instructions to perform a quantization operation on an input image and generate an output image. The processor 1020 may be configured to execute the one or more instructions to obtain a plurality of patch images. The processor 1020 may be configured to execute the one or more instructions to generate differentiation data for differentiating whether one or more patch images included in each cluster formed by clustering the plurality of patch images correspond to reference patch images or query patch images.

The processor 1020 may be configured to execute the one or more instructions to generate a target feature map of a target patch image included in a target cluster from among the plurality of patch images. The processor 1020 may be configured to execute the one or more instructions to determine a feature map type of the target feature map, based on the differentiation data. The processor 1020 may be configured to execute the one or more instructions to perform quantization on the target feature map based on a different number of bits according to the feature map type of the target feature map.

The processor 1020 may be configured to execute the one or more instructions to perform quantization on the target feature map, based on a first number of bits, when the feature map type of the target feature map is a reference feature map, and perform quantization on the target feature map, based on a second number of bits, when the feature map type of the target feature map is a query feature map. The processor 1020 may be configured to execute the one or more instructions to recover a quantization error of the target feature map on which quantization is performed based on the second number of bits by using an auxiliary feature map corresponding to the reference patch image included in the target cluster and on which quantization is performed based on the first number of bits.

The memory 1010 may be a storage for storing data and may store, for example, various algorithms, programs, and data. The memory 1010 may store one or more instructions. The memory 1010 may include at least one of a volatile memory and a nonvolatile memory. The nonvolatile memory may include ROM, PROM, EPROM, EEPROM, flash memory, PRAM, MRAM, RRAM, etc.

The volatile memory may include DRAM, SRAM, SDRAM, PRAM, MRAM, RRAM, etc. Also, according to an embodiment, the memory 1010 may include at least one of an HDD, an SSD, CF memory, SD memory, micro-SD memory, mini-SD memory, xD memory, or a memory stick. According to an embodiment, the memory 1010 may semi-permanently or temporarily store algorithms, programs, and one or more instructions executed by the processor 1020.

While the inventive concept has been particularly shown and described with reference to example embodiments thereof, it will be understood that various changes in form and details may be made therein without departing from the spirit and scope of the following claims.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. An image processing device comprising:

a pre-processor configured to split an input image into a plurality of patch images; and a neural network processor configured to generate an output image by performing an image processing operation on each of the plurality of patch images, wherein the neural network processor comprises:

a clustering block trained to cluster the plurality of patch images into a plurality of clusters and differentiate one or more patch images included in each of the plurality of clusters into a reference patch image and a query patch image; and a super-resolution block trained to perform quantization on the reference patch image using a first number of bits and on the query patch image using a second number of bits different from the first number, and wherein the clustering block is configured to generate a feature vector corresponding to each of the plurality of patch images by performing a convolution operation, a pooling operation, and a fully connected operation on each of the plurality of patch images.

2. The image processing device of claim 1, wherein the super-resolution block comprises one or more first residual blocks and one or more second residual blocks, each of the one or more first residual blocks is configured to perform quantization on a reference feature map corresponding to the reference patch image based on the first number of bits, and each of the one or more second residual blocks is configured to perform quantization on a query feature map corresponding to the query patch image based on the second number of bits, wherein the second number of bits is different from the first number of bits.

3. The image processing device of claim 2, wherein a number of the one or more second residual blocks included in the super-resolution block is less than a number of the one or more first residual blocks included in the super-resolution block.

4. The image processing device of claim 2, wherein each of the one or more first residual blocks is further configured to perform quantization on a reference weight for the reference feature map based on the first number of bits, and each of the one or more second residual blocks is further configured to perform quantization on a query weight for the query feature map based on a third number of bits.

5. The image processing device of claim 4, wherein the third number of bits is less than the first number of bits and greater than the second number of bits.

6. The image processing device of claim 1, wherein the clustering block is configured to:

generate first classification data by applying a softmax function to a feature vector corresponding to each of the plurality of patch images;

generate second classification data by applying a transpose softmax function to the feature vector corresponding to each of the plurality of patch images; and differentiate the reference patch image and the query patch image in each cluster based on the first classification data and the second classification data.

7. The image processing device of claim 1, further comprising one or more error recovery blocks configured to recover a quantization error for a target query patch image from among the patch images included in a target cluster, wherein the one or more error recovery blocks are further configured to recover a quantization error of a target query feature map corresponding to the target query patch image based on an auxiliary feature map corresponding to the reference patch image included in the target cluster.

8. The image processing device of claim 7, wherein the one or more error recovery blocks are further configured to:

perform a warping operation to warp the auxiliary feature map to the target query feature map;

perform a subtraction operation to subtract the warped auxiliary feature map from the target query feature map;

generate a recovery query feature map by performing a quantization operation and an active function operation on a result of the subtraction; and perform an addition operation to add the recovery query feature map to the target query feature map.

9. The image processing device of claim 8, wherein the one or more error recovery blocks are further configured to perform quantization based on a first number of bits.

10. An image processing method comprising:

obtaining a plurality of patch images;

generating differentiation data for differentiating whether one or more patch images included in each of a plurality of clusters formed by clustering the plurality of patch images correspond to a reference patch image or a query patch image;

generating a target feature map of a target patch image included in a target cluster from among the plurality of patch images;

determining a feature map type of the target feature map based on the differentiation data; and performing quantization on the target feature map using a first number of bits or a second number of bits different from the first number of bits, wherein the performing of the quantization comprises:

the quantization on the target feature map based on a first number of bits, wherein the feature map type of the target feature map corresponds to a reference feature map of the reference patch image; and performing the quantization on the target feature map based on a second number of bits different from the first number of bits, wherein the feature map type of the target feature map corresponds to a query feature map of the query patch image.

11. The image processing method of claim 10, wherein the generating of the differentiation data comprises:

generating a feature vector corresponding to each of the plurality of patch images by extracting a feature of each of the plurality of patch images; and generating the differentiation data based on the feature vector corresponding to each of the plurality of patch images.

12. The image processing method of claim 11, wherein the generating of the feature vector comprises:

performing a convolution operation on each of the plurality of patch images;

performing a pooling operation on an output of the convolution operation;

performing a fully connected operation on an output of the pooling operation; and generating the feature vector corresponding to each of the plurality of patch images.

13. The image processing method of claim 11, wherein the generating of the differentiation data by using the feature vector comprises:

generating first classification data by applying a softmax function to the feature vector corresponding to each of the plurality of patch images;

generating second classification data by applying a transpose softmax function to the feature vector corresponding to each of the plurality of patch images; and generating the differentiation data based on the first classification data and the second classification data.

14. The image processing method of claim 10, wherein the performing of the quantization on the target feature map comprises recovering a quantization error of the target feature map, wherein the quantization is performed based on the second number of bits using an auxiliary feature map obtained based on quantization performed with the first number of bits, and wherein the auxiliary feature map corresponds to the reference patch image included in the target cluster.

15. The image processing method of claim 14, wherein the recovering of the quantization error comprises:

performing a warping operation to warp the auxiliary feature map to the target feature map;

performing a subtraction operation to subtract the warped auxiliary feature map from the target feature map;

generating a recovery query feature map by performing a quantization operation and an activation function operation on a result of the subtraction; and performing an addition operation to add the recovery query feature map to the target feature map.

16. The image processing method of claim 15, wherein the generating of the recovery query feature map comprises performing the quantization on the result of the subtraction based on the first number of bits.

17. An image processing device comprising:

a memory storing one or more instructions; and one or more processors configured to execute the one or more instructions to:

obtain a plurality of patch images;

generate differentiation data for differentiating whether one or more patch images included in each of a plurality of clusters formed by clustering the plurality of patch images correspond to a reference patch image or a query patch image;

generate a target feature map of a target patch image included in a target cluster from among the plurality of patch images;

determine a feature map type of the target feature map based on the differentiation data;

perform quantization on the target feature map using a first number of bits or a second number of bits different from the first number of bits; and recover a quantization error of the target feature map, wherein the quantization is performed based on the second number of bits using an auxiliary feature map obtained based on quantization performed with the first number of bits, and the auxiliary feature map corresponds to the reference patch image included in the target cluster.

* * * * *